(12) United States Patent
Walton et al.

(10) Patent No.: US 7,095,709 B2
(45) Date of Patent: Aug. 22, 2006

(54) DIVERSITY TRANSMISSION MODES FOR MIMO OFDM COMMUNICATION SYSTEMS

(75) Inventors: Jay R. Walton, Carlisle, MA (US); John W. Ketchum, Harvard, MA (US)

(73) Assignee: QUALCOMM, Incorporated, San Diego, CA (US)

( * ) Notice: Subject to any disclaimer, the term of this patent is extended or adjusted under 35 U.S.C. 154(b) by 266 days.

(21) Appl. No.: 10/179,439

(22) Filed: Jun. 24, 2002

(65) Prior Publication Data

US 2003/0235147 A1 Dec. 25, 2003

(51) Int. Cl.
*H04J 11/00* (2006.01)
(52) U.S. Cl. .................. 370/208; 370/341; 375/267
(58) Field of Classification Search ............. 370/210, 370/208, 329, 209, 341, 342, 242, 522, 335; 375/130, 285, 146.47, 267, 299; 455/562, 455/561, 67.11
See application file for complete search history.

(56) References Cited

U.S. PATENT DOCUMENTS

| | | | | |
|---|---|---|---|---|
| 5,511,067 | A * | 4/1996 | Miller ........................ | 370/335 |
| 6,067,290 | A * | 5/2000 | Paulraj et al. ............... | 370/329 |
| 6,452,981 | B1 * | 9/2002 | Raleigh et al. .............. | 375/299 |
| 6,466,767 | B1 * | 10/2002 | Lidbrink et al. ........... | 455/67.11 |
| 6,690,712 | B1 * | 2/2004 | Kim et al. ................... | 375/146 |
| 6,952,454 | B1 * | 10/2005 | Jalali et al. ................ | 370/208 |
| 2002/0041635 | A1 * | 4/2002 | Ma et al. ..................... | 375/267 |
| 2002/0115473 | A1 * | 8/2002 | Hwang et al. .............. | 455/562 |
| 2002/0122381 | A1 * | 9/2002 | Wu et al. .................... | 370/208 |
| 2002/0122383 | A1 * | 9/2002 | Wu et al. .................... | 370/210 |
| 2002/0131516 | A1 * | 9/2002 | El-Gamal et al. .......... | 375/285 |
| 2002/0136158 | A1 * | 9/2002 | Frank ........................ | 370/209 |
| 2003/0112880 | A1 * | 6/2003 | Walton et al. .............. | 375/260 |
| 2003/0128658 | A1 * | 7/2003 | Walton et al. .............. | 370/208 |
| 2006/0023666 | A1 * | 2/2006 | Jalali et al. ................ | 370/334 |

FOREIGN PATENT DOCUMENTS

| EP | 1 182 799 A2 | 2/2002 |
|---|---|---|
| WO | 01/76110 A2 | 10/2001 |
| WO | WO3003/08575 | * 10/2003 |

* cited by examiner

*Primary Examiner*—Duc Ho
*Assistant Examiner*—Phuongchau Ba Nguyen
(74) *Attorney, Agent, or Firm*—Philip R. Wadsworth; Sandip (Micky) S. Minhas; Dmitry R. Milikovsky

(57) ABSTRACT

Techniques for transmitting data using a number of diversity transmission modes to improve reliability. At a transmitter, for each of one or more data streams, a particular diversity transmission mode is selected for use from among a number of possible transmission modes. These transmission modes may include a frequency diversity transmission mode, a Walsh diversity transmission mode, a space time transmit diversity (STTD) transmission mode, and a Walsh-STTD transmission mode. Each diversity transmission mode redundantly transmits data over time, frequency, space, or a combination thereof. Each data stream is coded and modulated to provide modulation symbols, which are further processed based on the selected diversity transmission mode to provide transmit symbols. For OFDM, the transmit symbols for all data streams are further OFDM modulated to provide a stream of transmission symbols for each transmit antenna used for data transmission.

3 Claims, 11 Drawing Sheets

DIVERSITY TRANSMISSION MODES FOR MIMO OFDM COMMUNICATION SYSTEMS

BACKGROUND

1. Field

The present invention relates generally to data communication, and more specifically to techniques for transmitting data using a number of diversity transmission modes in MIMO OFDM systems.

2. Background

Wireless communication systems are widely deployed to provide various types of communication such as voice, packet data, and so on. These systems may be multiple-access systems capable of supporting communication with multiple users either sequentially or simultaneously. This is achieved by sharing the available system resources, which may be quantified by the total available operating bandwidth and transmit power.

A multiple-access system may include a number of access points (or base stations) that communicate with a number of user terminals. Each access point may be equipped with one or multiple antennas for transmitting and receiving data. Similarly, each terminal may be equipped with one or multiple antennas.

The transmission between a given access point and a given terminal may be characterized by the number of antennas used for data transmission and reception. In particular, the access point and terminal pair may be viewed as (1) a multiple-input multiple-output (MIMO) system if multiple ($N_T$) transmit antennas and multiple ($N_R$) receive antennas are employed for data transmission, (2) a multiple-input single-output (MISO) system if multiple transmit antennas and a single receive antenna are employed, (3) a single-input multiple-output (SIMO) system if a single transmit antenna and multiple receive antennas are employed, or (4) a single-input single-output (SISO) system if a single transmit antenna and a single receive antenna are employed.

For a MIMO system, a MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel of the MIMO channel and corresponds to a dimension. The MIMO system can provide improved performance (e.g., increased transmission capacity and/or greater reliability) if the additional dimensionalities created by the multiple transmit and receive antennas are utilized. For a MISO system, only one spatial subchannel is available for data transmission. However, the multiple transmit antennas may be used to transmit data in a manner to improve the likelihood of correct reception by the receiver.

The spatial subchannels of a wideband system may encounter different channel conditions due to various factors such as fading and multipath. Each spatial subchannel may thus experience frequency selective fading, which is characterized by different channel gains at different frequencies of the overall system bandwidth. It is well known that frequency selective fading causes inter-symbol interference (ISI), which is a phenomenon whereby each symbol in a received signal acts as distortion to subsequent symbols in the received signal. The ISI distortion degrades performance by impacting the ability to correctly detect the received symbols.

To combat frequency selective fading, orthogonal frequency division multiplexing (OFDM) may be used to effectively partition the overall system bandwidth into a number of ($N_F$) subbands, which may also be referred to as OFDM subbands, frequency bins, or frequency sub-channels. Each subband is associated with a respective subcarrier upon which data may be modulated. For each time interval that may be dependent on the bandwidth of one subband, a modulation symbol may be transmitted on each of the $N_F$ subbands.

For a multiple-access system, a given access point may communicate with terminals having different number of antennas at different times. Moreover, the characteristics of the communication channels between the access point and the terminals typically vary from terminal to terminal and may further vary over time, especially for mobile terminals. Different transmission schemes may then be needed for different terminals depending on their capabilities and requirements.

There is therefore a need in the art for techniques for transmitting data using a number of diversity transmission modes depending on the capability of the receiver device and the channel conditions.

SUMMARY

Techniques are provided herein for transmitting data in a manner to improve the reliability of data transmission. A MIMO OFDM system may be designed to support a number of modes of operation for data transmission. These transmission modes may include diversity transmission modes, which may be used to achieve higher reliability for certain data transmission (e.g., for overhead channels, poor channel conditions, and so on). The diversity transmission modes attempt to achieve transmit diversity by establishing orthogonality among multiple signals transmitted from multiple transmit antennas. Orthogonality among the transmitted signals may be attained in frequency, time, space, or any combination thereof. The transmission modes may also include spatial multiplexing transmission modes and beam steering transmission modes, which may be used to achieve higher bit rates under certain favorable channel conditions.

In an embodiment, a method is provided for processing data for transmission in a wireless (e.g., MIMO OFDM) communication system. In accordance with the method, a particular diversity transmission mode to use for each of one or more data streams is selected from among a number of possible transmission modes. Each diversity transmission mode redundantly transmits data over time, frequency, space, or a combination thereof. Each data stream is coded and modulated based on coding and modulation schemes selected for the data stream to provide modulation symbols. The modulation symbols for each data stream are further processed based on the selected diversity transmission mode to provide transmit symbols. For OFDM, the transmit symbols for all data streams are further OFDM modulated to provide a stream of transmission symbols for each of one or more transmit antennas used for data transmission. Pilot symbols may also be multiplexed with the modulation symbols using frequency division multiplexing (FDM), time division multiplexing (TDM), code division multiplexing (CDM), or any combination thereof.

The transmission modes may include, for example, (1) a frequency diversity transmission mode that redundantly transmits modulation symbols over multiple OFDM subbands, (2) a Walsh diversity transmission mode that transmits each modulation symbol over $N_T$ OFDM symbol periods, where $N_T$ is the number of transmit antennas used for data transmission, (3) a space time transmit diversity (STTD) transmission mode that transmits modulation symbols over multiple OFDM symbol periods and multiple transmit antennas, and (4) a Walsh-STTD transmission mode that transmits modulation symbols using a combination of Walsh diversity and STTD. For the Walsh diversity and Walsh-STTD transmission modes, the same modulation symbols may be redundantly transmitted over all transmit antennas or different modulation symbols may be transmitted over different transmit antennas.

Each data stream may be for an overhead channel or targeted for a specific receiver device. The data rate for each user-specific data stream may be adjusted based on the transmission capability of the receiver device. The transmit symbols for each data stream are transmitted on a respective group of one or more subbands.

In another embodiment, a method is provided for processing a data transmission at a receiver of a wireless communication system. In accordance with the method, the particular diversity transmission mode used for each of one or more data streams to be recovered is initially determined. The diversity transmission mode used for each is selected from among a number of possible transmission modes. Received symbols for each data stream are then processed based on the diversity transmission mode used for the data stream to provide recovered symbols, which are estimates of modulation symbols transmitted from a transmitter for the data stream. The recovered symbols for each data stream are further demodulated and decoded to provide decoded data for the data stream.

Various aspects and embodiments of the invention are described in further detail below. The invention further provides methods, transmitter units, receiver units, terminals, access points, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
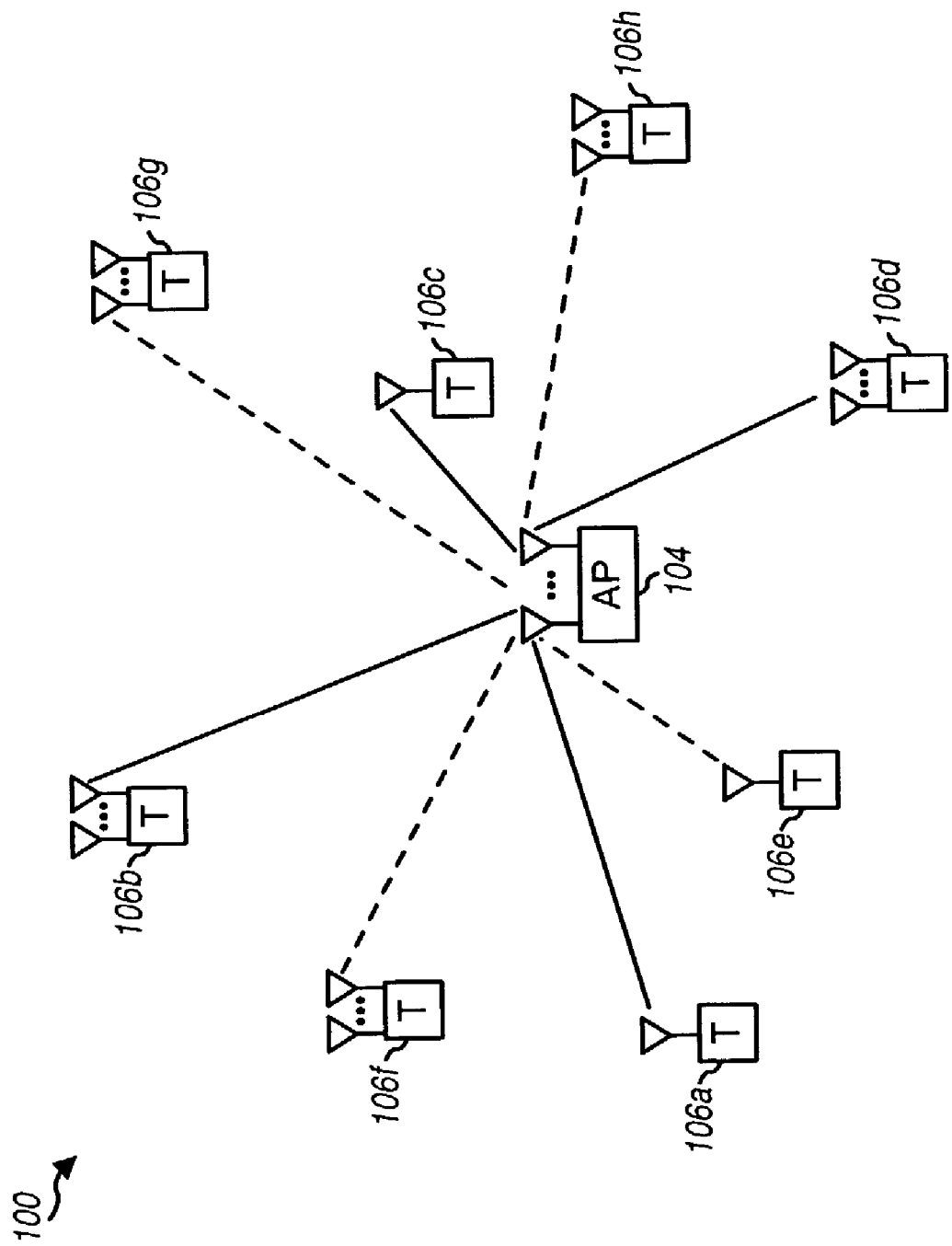
FIG. 1 is a diagram of a multiple-access system that supports a number of users.

FIG. 1 is a diagram of a multiple-access system 100 that supports a number of users. System 100 includes one or more access points (AP) 104 that communicate with a number of terminals (T) 106 (only one access point is shown in FIG. 1 for simplicity). An access point may also be referred to as a base station, a UTRAN, or some other terminology. A terminal may also be referred to as a handset, a mobile station, a remote station, user equipment (UE), or some other terminology. Each terminal 106 may concurrently communicate with multiple access points 104 when in soft handoff (if soft handoff is supported by the system).

In an embodiment, each access point 104 employs multiple antennas and represents (1) the multiple-input (MI) for a downlink transmission from the access point to a terminal and (2) the multiple-output (MO) for an uplink transmission from the terminal to the access point. A set of one or more terminals 106 communicating with a given access point collectively represents the multiple-output for the downlink transmission and the multiple-input for the uplink transmission.

Each access point 104 can communicate with one or multiple terminals 106, either concurrently or sequentially, via the multiple antennas available at the access point and the one or more antennas available at each terminal. Terminals not in active communication may receive pilots and/or other signaling information from the access point, as shown by the dashed lines for terminals 106e through 106h in FIG. 1.

For the downlink, the access point employs $N_T$ antennas and each terminal employs 1 or $N_R$ antennas for reception of one or more data streams from the access point. In general, $N_R$ can be different for different multi-antenna terminals and can be any integer. A MIMO channel formed by the $N_T$ transmit antennas and $N_R$ receive antennas may be decomposed into $N_S$ independent channels, with $N_S \leq \min\{N_T, N_R\}$. Each such independent channel is also referred to as a spatial subchannel of the MIMO channel. The terminals concurrently receiving downlink data transmission need not be equipped with equal number of receive antennas.

For the downlink, the number of receive antennas at a given terminal may be equal to or greater than the number of transmit antennas at the access point (i.e., $N_R \geq N_T$). For such a terminal, the number of spatial subchannels is limited by the number of transmit antennas at the access point. Each multi-antenna terminal communicates with the access point via a respective MIMO channel formed by the access point's $N_T$ transmit antennas and its own $N_R$ receive antennas. However, even if multiple multi-antenna terminals are selected for concurrent downlink data transmission, only $N_S$ spatial subchannels are available regardless of the number of terminals receiving the downlink transmission.

For the downlink, the number of receive antennas at a given terminal may also be less than the number of transmit antennas at the access point (i.e., $N_R < N_T$). For example, a MISO terminal is equipped with a single receive antenna ($N_R = 1$) for downlink data transmission. The access point may then employ diversity, beam steering, space division multiple access (SDMA), or some other transmission techniques to communicate simultaneously with one or multiple MISO terminals.

For the uplink, each terminal may employ a single antenna or multiple antennas for uplink data transmission. Each terminal may also utilize all or only a subset of its available antennas for uplink transmission. At any given moment, the $N_T$ transmit antennas for the uplink are formed by all antennas used by one or more active terminals. The MIMO channel is then formed by the $N_T$ transmit antennas from all active terminals and the access point's $N_R$ receive antennas. The number of spatial subchannels is limited by the number of transmit antennas, which is typically limited by the number of receive antennas at the access point (i.e., $N_S \leq \min\{N_T, N_R\}$).

Figure 2:
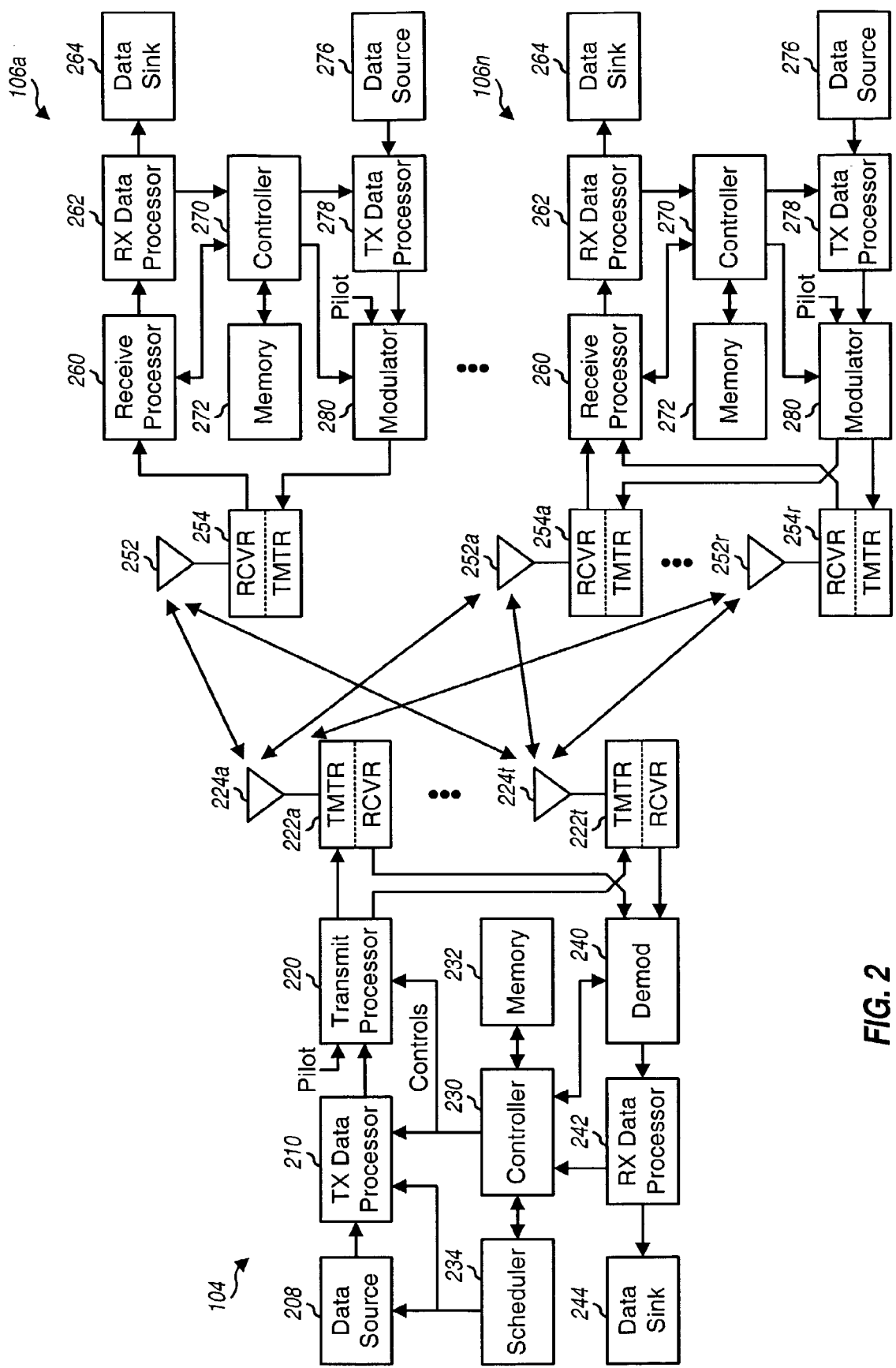
FIG. 2 is a block diagram of an embodiment of an access point and two terminals.

FIG. 2 is a block diagram of an embodiment of access point 104 and two terminals 106. On the downlink, at access point 104, various types of traffic data such as user-specific data from a data source 208, signaling, and so on are provided to a transmit (TX) data processor 210. Processor 210 then formats and encodes the traffic data based on one or more coding schemes to provide coded data. The coded data is then interleaved and further modulated (i.e., symbol mapped) based on one or more modulation schemes to provide modulation symbols (i.e., modulated data). The data rate, coding, interleaving, and symbol mapping may be determined by controls provided by a controller 230 and a scheduler 234. The processing by TX data processor 210 is described in further detail below.

A transmit processor 220 then receives and processes the modulation symbols and pilot data to provide transmission symbols. The pilot data is typically known data processed in a known manner, if at all. In a specific embodiment, the processing by transmit processor 220 includes (1) processing the modulation symbols based on one or more transmission modes selected for use for data transmission to the terminals to provide transmit symbols and (2) OFDM processing the transmit symbols to provide transmission symbols. The processing by transmit processor 220 is described in further detail below.

Transmit processor 220 provides $N_T$ streams of transmission symbols to $N_T$ transmitters (TMTR) 222a through 222t, one transmitter for each antenna used for data transmission. Each transmitter 222 converts its transmission symbol stream into one or more analog signals and further conditions (e.g., amplifies, filters, and frequency upconverts) the analog signals to generate a respective downlink modulated signal suitable for transmission over a wireless communication channel. Each downlink modulated signal is then transmitted via a respective antenna 224 to the terminals.

At each terminal 106, the downlink modulated signals from multiple transmit antennas of the access point are received by one or multiple antennas 252 available at the terminal. The received signal from each antenna 252 is provided to a respective receiver (RCVR) 254. Each receiver 254 conditions (e.g., filters, amplifies, and frequency downconverts) its received signal and further digitizes the conditioned signal to provide a respective stream of samples.

A receive processor 260 then receives and processes the streams of samples from all receivers 254 to provide recovered symbols (i.e., demodulated data). In a specific embodiment, the processing by receive processor 260 includes (1) OFDM processing the received transmission symbols to provide received symbols, and (2) processing the received symbols based on the selected transmission mode(s) to obtain recovered symbols. The recovered symbols are estimates of the modulation symbols transmitted by the access point. The processing by receive processor 260 is described in further detail below.

A receive (RX) data processor 262 then symbol demaps, deinterleaves, and decodes the recovered symbols to obtain the user-specific data and signaling transmitted on the downlink for the terminal. The processing by receive processor 260 and RX data processor 262 is complementary to that performed by transmit processor 220 and TX data processor 210, respectively, at the access point.

On the uplink, at terminal 106, various types of traffic data such as user-specific data from a data source 276, signaling, and so on are provided to a TX data processor 278. Processor 278 codes the different types of traffic data in accordance with their respective coding schemes to provide coded data and further interleaves the coded data. A modulator 280 then symbol maps the interleaved data to provide modulated data, which is provided to one or more transmitters 254. OFDM may or may not be used for the uplink data transmission, depending on the system design. Each transmitter 254 conditions the received modulated data to generate a respective uplink modulated signal, which is then transmitted via an associated antenna 252 to the access point.

At access point 104, the uplink modulated signals from one or more terminals are received by antennas 224. The received signal from each antenna 224 is provided to a receiver 222, which conditions and digitizes the received signal to provide a respective stream of samples. The sample streams from all receivers 222 are then processed by a demodulator 240 and further decoded (if necessary) by an RX data processor 242 to recover the data transmitted by the terminals.

Controllers 230 and 270 direct the operation at the access point and the terminal, respectively. Memories 232 and 272 provide storage for program codes and data used by controllers 230 and 270, respectively. Scheduler 234 schedules the data transmission on the downlink (and possibly the uplink) for the terminals.

For clarity, various transmit diversity schemes are specifically described below for downlink transmission. These schemes may also be used for uplink transmission, and this is within the scope of the invention. Also for clarity, in the following description, subscript "i" is used as an index for the receive antennas, subscript "j" is used as an index for the transmit antennas, and subscript "k" is used as an index for the subbands in the MIMO OFDM system.

Transmitter Unit

Figure 3:
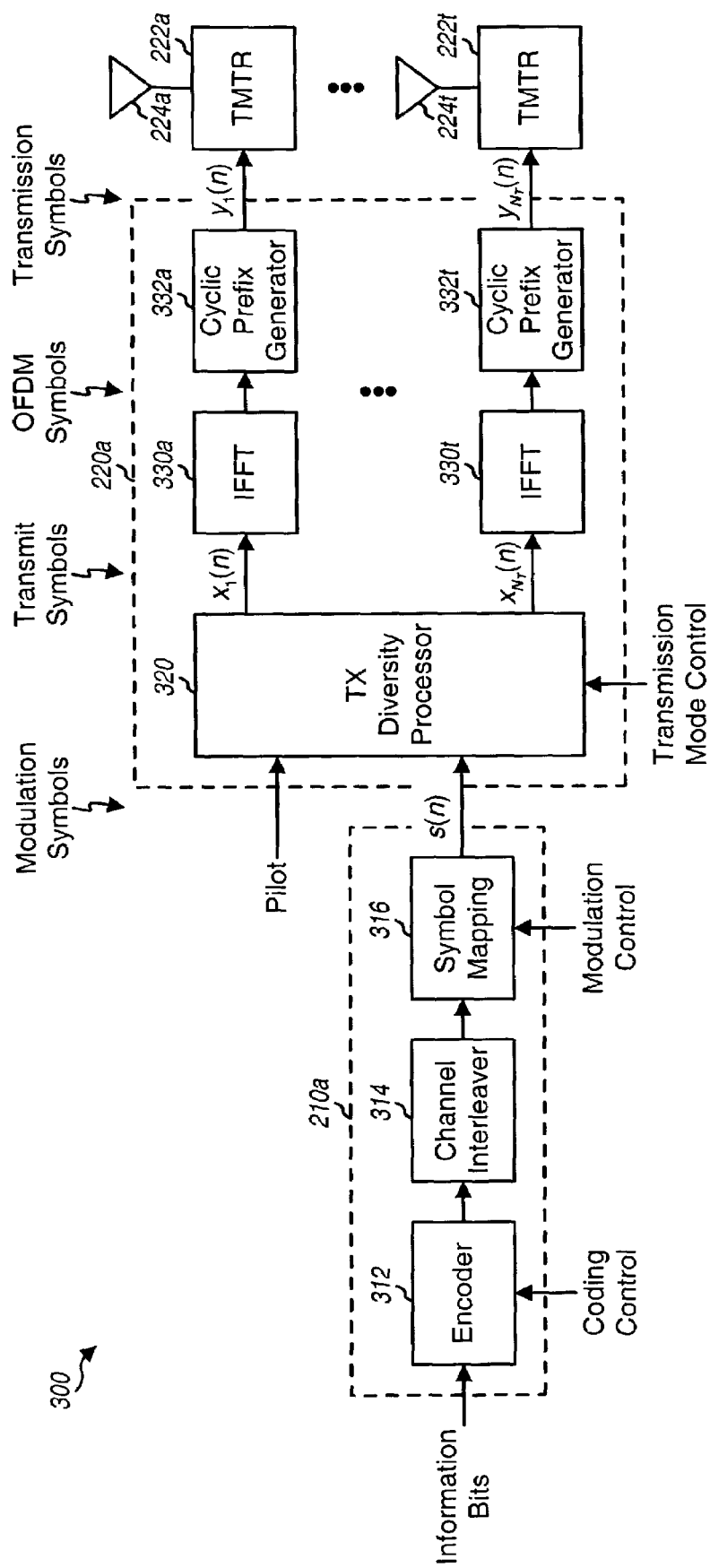
FIG. 3 is a block diagram of a transmitter unit.

FIG. 3 is a block diagram of a transmitter unit 300, which is an embodiment of the transmitter portion of access point 104. Transmitter unit 300 includes (1) a TX data processor 210a that receives and processes traffic and pilot data to provide modulation symbols and (2) a transmit processor 220a that further processes the modulation symbols to provide $N_T$ streams of transmission symbols for the $N_T$ transmit antennas. TX data processor 210a and transmit processor 220a are one embodiment of TX data processor 210 and transmit processor 220, respectively, in FIG. 2.

In the specific embodiment shown in FIG. 3; TX data processor 210a includes an encoder 312, a channel interleaver 314, and a symbol mapping element 316. Encoder 312 receives and codes the traffic data (i.e., the information bits) based on one or more coding schemes to provide coded bits. The coding increases the reliability of the data transmission.

In an embodiment, the user-specific data for each terminal and the data for each overhead channel may be considered as distinct data streams. The overhead channels may include broadcast, paging, and other common channels intended to be received by all terminals. Multiple data streams may also be sent to a given terminal. Each data stream may be coded independently based on a specific coding scheme selected for that data stream. Thus, a number of independently coded data streams may be provided by encoder 312 for different overhead channels and terminals.

The specific coding scheme to be used for each data stream is determined by a coding control from controller 230. The coding scheme for each terminal may be selected, for example, based on feedback information received from the terminal. Each coding scheme may include any combination of forward error detection (FED) codes (e.g., a cyclic redundancy check (CRC) code) and forward error correction (FEC) codes (e.g., a convolutional code, a Turbo code, a block code, and so on). A coding scheme may also designate no coding at all. Binary or trellis-based codes may also be used for each data stream. Moreover, with convolutional and Turbo codes, puncturing may be used to adjust the code rate. More specifically, puncturing may be used to increase the code rate above the base code rate.

In a specific embodiment, the data for each data stream is initially partitioned into frames (or packets). For each frame, the data may be used to generate a set of CRC bits for the frame, which is then appended to the data. The data and CRC bits for each frame are then coded with either a convolutional code or a Turbo code to generate the coded data for the frame.

Channel interleaver 314 receives and interleaves the coded bits based on one or more interleaving schemes. Typically, each coding scheme is associated with a corresponding interleaving scheme. In this case, each independently coded data stream would be interleaved separately. The interleaving provides time diversity for the coded bits, permits each data stream to be transmitted based on an average SNR of the subbands and spatial subchannels used for the data stream, combats fading, and further removes correlation between coded bits used to form each modulation symbol.

With OFDM, the channel interleaver may be designed to distribute the coded data for each data stream over multiple subbands of a single OFDM symbol or possibly over multiple OFDM symbols. The objective of the channel interleaver is to randomize the coded data so that the likelihood of consecutive coded bits being corrupted by the communication channel is reduced. When the interleaving interval for a given data stream spans a single OFDM symbol, the coded bits for the data stream are randomly distributed across the subbands used for the data stream to exploit frequency diversity. When the interleaving interval spans multiple OFDM symbols, the coded bits are randomly distributed across the data-carrying subbands and the multi-symbol interleaving interval to exploit both frequency and time diversity. For a wireless local area network (WLAN), the time diversity realized by interleaving over multiple OFDM symbols may not be significant if the minimum expected coherence time of the communication channel is many times longer than the interleaving interval.

Symbol mapping element 316 receives and maps the interleaved data in accordance with one or more modulation schemes to provide modulation symbols. A particular modulation scheme may be used for each data stream. The symbol mapping for each data stream may be achieved by grouping sets of $q_m$ coded and interleaved bits to form data symbols (each of which may be a non-binary value), and mapping each data symbol to a point in a signal constellation corresponding to the modulation scheme selected for use for that data stream. The selected modulation scheme may be QPSK, M-PSK, M-QAM, or some other modulation scheme. Each mapped signal point is a complex value and corresponds to an $M_m$-ary modulation symbol, where $M_m$ corresponds to the specific modulation scheme selected for data stream m and $M_m = 2^{q_m}$. Symbol mapping element 316 provides a stream of modulation symbols for each data stream. The modulation symbol streams for all data streams are collectively shown as modulation symbol stream s(n) in FIG. 3.

Table 1 lists various coding and modulation schemes that may be used to achieve a range of spectral efficiencies (or bit rates) using convolutional and Turbo codes. Each bit rate (in unit of bits/sec/Hertz or bps/Hz) may be achieved using a specific combination of code rate and modulation scheme. For example, a bit rate of one-half may be achieved using a code rate of ½ and BPSK modulation, a bit rate of one may be achieved using a code rate of ½ and QPSK modulation, and so on.

In Table 1, BPSK, QPSK, 16-QAM, and 64-QAM are used for the listed bit rates. Other modulation schemes such as DPSK, 8-PSK, 32-QAM, 128-QAM, and so on, may also be used and are within the scope of the invention. DPSK (differential phase-shift keying) may be used when the communication channel is difficult to track since a coherence reference is not needed at the receiver to demodulate a DPSK modulated signal. For OFDM, modulation may be performed on a per subband basis, and the modulation scheme to be used for each subband may be independently selected.

TABLE 1

| Convolutional Code | | | Turbo Code | | |
|---|---|---|---|---|---|
| Efficiency (bps/Hz) | Code rate | Modulation | Efficiency (bps/Hz) | Code rate | Modulation |
| 0.5 | 1/2 | BPSK | 0.5 | 1/2 | BPSK |
| 1.0 | 1/2 | QPSK | 1.0 | 1/2 | QPSK |
| 1.5 | 3/4 | QPSK | 1.5 | 3/4 | QPSK |
| 2.0 | 1/2 | 16-QAM | 2.0 | 1/2 | 16-QAM |
| 2.67 | 2/3 | 16-QAM | 2.5 | 5/8 | 16-QAM |
| 3.0 | 3/4 | 16-QAM | 3.0 | 3/4 | 16-QAM |
| 3.5 | 7/8 | 16-QAM | 3.5 | 7/12 | 64-QAM |
| 4.0 | 2/3 | 64-QAM | 4.0 | 2/3 | 64-QAM |
| 4.5 | 3/4 | 64-QAM | 4.5 | 3/4 | 64-QAM |
| 5.0 | 5/6 | 64-QAM | 5.0 | 5/6 | 64-QAM |

Other combinations of code rates and modulation schemes may also be used to achieve the various bit rates, and this is also within the scope of the invention.

In the specific embodiment shown in FIG. 3, transmit processor 220a includes a TX diversity processor 320 and $N_T$ OFDM modulators. Each OFDM modulator includes an inverse fast Fourier transform (IFFT) unit 330 and a cyclic prefix generator 332. TX diversity processor 320 receives and processes the modulation symbols from TX data processor 210a in accordance with one or more selected transmission modes to provide transmit symbols.

In an embodiment, TX diversity processor 320 further receives and multiplexes pilot symbols (i.e., pilot data) with the transmit symbols using frequency division multiplexing (FDM) in a subset of the available subbands. An example implementation of an FDM pilot transmission scheme is shown in Table 2. In this implementation, 64 subbands are available for the MIMO OFDM system, and subband indices ±7 and ±21 are used for pilot transmission. In alternative embodiments, the pilot symbols may be multiplexed with the transmit symbols using, for example, time division multiplexing (TDM), code division multiplexing (CDM), or any combination of FDM, TDM, and CDM.

TX diversity processor 320 provides one transmit symbol stream to each OFDM modulator. The processing by TX diversity processor 320 is described in further detail below.

Each OFDM modulator receives a respective transmit symbol stream $x_j(n)$. Within each OFDM modulator, IFFT unit 330 groups each set of $N_F$ transmit symbols in stream $x_j(n)$ to form a corresponding symbol vector, and converts the symbol vector into its time-domain representation (which is referred to as an OFDM symbol) using the inverse fast Fourier transform.

For each OFDM symbol, cyclic prefix generator 332 repeats a portion of the OFDM symbol to form a corresponding transmission symbol. The cyclic prefix ensures that the transmission symbol retains its orthogonal property in the presence of multipath delay spread, thereby improving performance against deleterious path effects such as channel dispersion caused by frequency selective fading. A fixed or an adjustable cyclic prefix may be used for each OFDM symbol. As a specific example of an adjustable cyclic prefix, a system may have a bandwidth of 20 MHz, a chip period of 50 nsec, and 64 subbands. For this system, each OFDM symbol would have a duration of 3.2 μsec (or 64×50 nsec). The cyclic prefix for each OFDM symbol may have a minimum length of 4 chips (200 nsec) and a maximum length of 16 chips (800 nsec), with an increment of 4 chips (200 nsec). Each transmission symbol would then have a duration ranging from 3.4 μsec to 4.0 μsec for cyclic prefixes of 200 nsec to 800 nsec, respectively.

Cyclic prefix generator 332 in each OFDM modulator provides a stream of transmission symbols to an associated transmitter 222. Each transmitter 222 receives and processes a respective transmission symbol stream to generate a downlink modulated signal, which is then transmitted from the associated antenna 224.

The coding and modulation for a MIMO OFDM system are described in further detail in the following U.S. patent applications:

U.S. patent application Ser. No. 09/993,087, entitled "Multiple-Access Multiple-Input Multiple-Output (MIMO) Communication System," filed Nov. 6, 2001;

U.S. patent application Ser. No. 09/854,235, entitled "Method and Apparatus for Processing Data in a Multiple-Input Multiple-Output (MIMO) Communication System Utilizing Channel State Information," filed May 11, 2001;

U.S. patent application Ser. Nos. 09/826,481 and 09/956,449, both entitled "Method and Apparatus for Utilizing Channel State Information in a Wireless Communication System," respectively filed Mar. 23, 2001 and Sep. 18, 2001;

U.S. patent application Ser. No. 09/776,075, entitled "Coding Scheme for a Wireless Communication System," filed Feb. 1, 2001; and U.S. patent application Ser. No. 09/532,492, entitled "High Efficiency, High Performance Communications System Employing Multi-Carrier Modulation," filed Mar. 30, 2000.

These patent applications are all assigned to the assignee of the present application and incorporated herein by reference.

The MIMO OFDM system may be designed to support a number of modes of operation for data transmission. These transmission modes include diversity transmission modes, spatial multiplexing transmission modes, and beam steering transmission modes.

The spatial multiplexing and beam steering modes may be used to achieve higher bit rates under certain favorable channel conditions. These transmission modes are described in further detail in U.S. patent application Ser. No. 10/085,456, entitled "Multiple-Input, Multiple-Output (MIMO) Systems with Multiple Transmission Modes," filed Feb. 26, 2002, assigned to the assignee of the present application and incorporated herein by reference.

The diversity transmission modes may be used to achieve higher reliability for certain data transmissions. For example, the diversity transmission modes may be used for overhead channels on the downlink, such as broadcast, paging, and other common channels. The diversity transmission modes may also be used for data transmission (1) whenever the transmitter does not have adequate channel state information (CSI) for the communication channel, (2) when the channel conditions are sufficiently poor (e.g., under certain mobility conditions) and cannot support more spectrally efficient transmission modes, and (3) for other situations. When the diversity transmission modes are used for downlink data transmission to the terminals, the rate and/or power for each terminal may be controlled to improve performance. A number of diversity transmission modes may be supported and are described in further detail below.

The diversity transmission modes attempt to achieve transmit diversity by establishing orthogonality among the multiple signals transmitted from multiple transmit antennas. Orthogonality among the transmitted signals may be attained in frequency, time, space, or any combination thereof. Transmit diversity may be established via any one or combination of the following processing techniques:

Frequency (or subband) diversity. The inherent orthogonality among the subbands provided by OFDM is used to provide diversity against frequency selective fading.

Transmit diversity using orthogonal functions. Walsh functions or some other orthogonal functions are applied to OFDM symbols transmitted from multiple transmit antennas to establish orthogonality among the transmitted signals. This scheme is also referred to herein as the "Walsh diversity" scheme.

Space time transmit diversity (STTD). Spatial orthogonality is established between pairs of transmit antennas while preserving the potential for high spectral efficiency offered by MIMO techniques.

In general, the frequency diversity scheme may be used to combat frequency selective fading and operates in the frequency and spatial dimensions. The Walsh diversity scheme and STTD scheme operate in the time and spatial dimensions.

For clarity, the processing techniques enumerated above and certain combinations thereof will be described for an example MIMO OFDM system. In this system, each access point is equipped with four antennas to transmit and receive data, and each terminal may be equipped with one or multiple antennas.

Frequency Diversity

Figure 4:
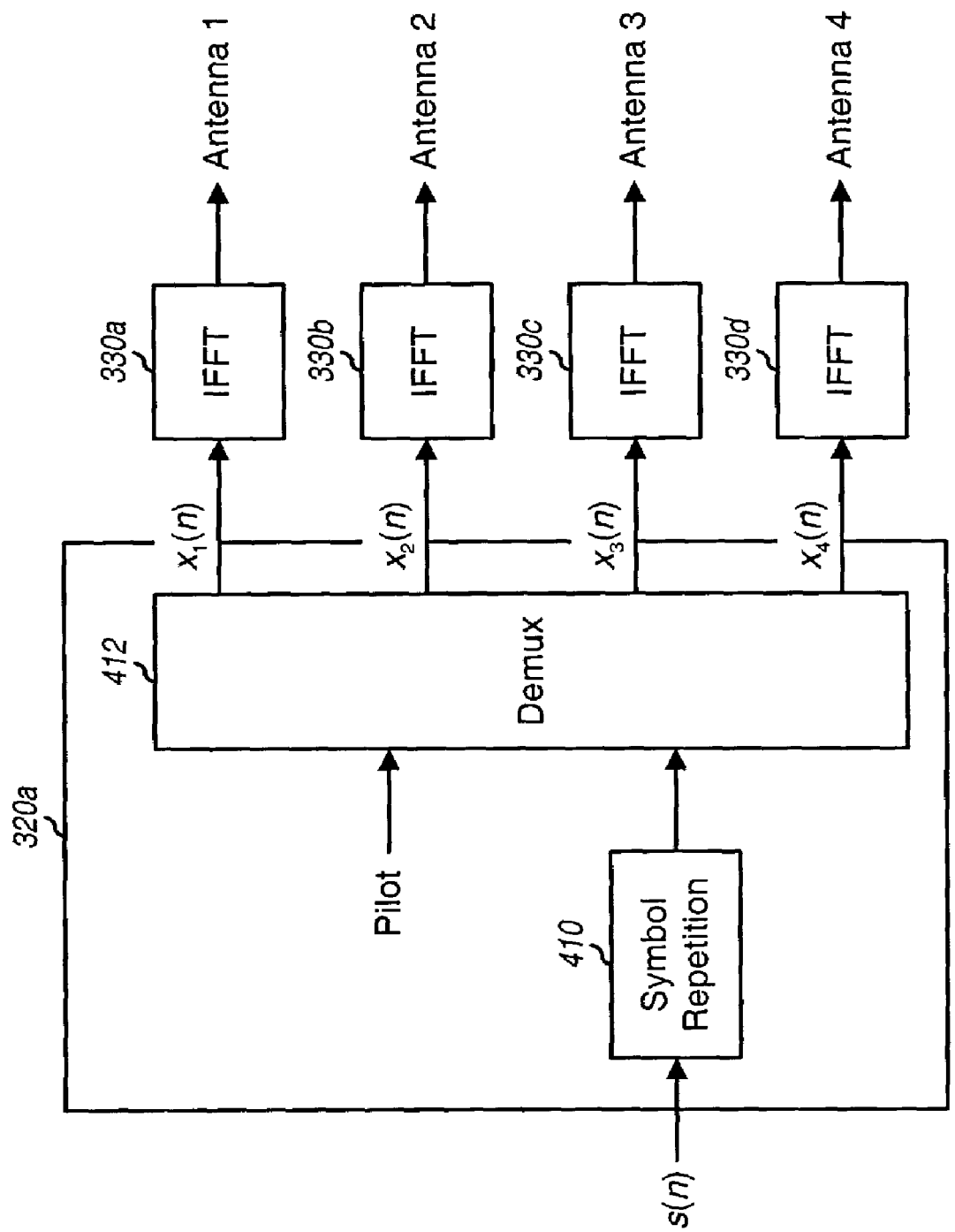
FIG. 4 is a block diagram of a TX diversity processor that may be used to implement the frequency diversity scheme.

FIG. 4 is a block diagram of an embodiment of a TX diversity processor 320a that may be used to implement the frequency diversity scheme. For OFDM, the subbands are inherently orthogonal to one another. Frequency diversity may be established by transmitting identical modulation symbols on multiple subbands.

As shown in FIG. 4, the modulation symbols, s(n), from TX data processor 210 are provided to a symbol repetition unit 410. Unit 410 repeats each modulation symbol based on the (e.g., dual or quad) diversity to be provided for the modulation symbol. A demultiplexer 412 then receives the repeated symbols and pilot symbols and demultiplexes these symbols into $N_T$ transmit symbol streams. The modulation symbols for each data stream may be transmitted on a respective group of one or more subbands assigned to that data stream. Some of the available subbands may be reserved for pilot transmission (e.g., using FDM). Alternatively, the pilot symbols may be transmitted along with the modulation symbols using TDM or CDM.

In general, it is desirable to transmit repeated symbols in subbands that are separated from each other by at least the coherence bandwidth of the communication channel. Moreover, the modulation symbols may be repeated over any number of subbands. A higher repetition factor corresponds to greater redundancy and improved likelihood of correct reception at the receiver at the expense of reduced efficiency.

For clarity, a specific implementation of the frequency diversity scheme is described below for a specific MIMO OFDM system that has some of the characteristics defined by the IEEE Standard 802.11a. The specifications for this IEEE standard are described in a document entitled "Part 11: Wireless LAN Medium Access Control (MAC) and Physical Layer (PHY) specifications: High-speed Physical Layer in the 5 GHz Band," September 1999, which is publicly available and incorporated herein by reference. This system has an OFDM waveform structure with 64 subbands. Of these 64 subbands, 48 subbands (with indices of ±{1, ..., 6, 8, ..., 20, 22, ..., 26}) are used for data, 4 subbands (with indices of ±{7, 21}) are used for pilot, the DC subband (with index of 0) is not used, and the remaining subbands are also not used and serve as guard subbands.

Table 2 shows a specific implementation for dual and quad frequency diversity for the system described above. For dual frequency diversity, each modulation symbol is transmitted over two subbands that are separated by either 26 or 27 subbands. For quad frequency diversity, each modulation symbol is transmitted over four subbands that are separated by 13 or 14 subbands. Other frequency diversity schemes may also be implemented and are within the scope of the invention.

TABLE 2

| Subband Indices | Dual Diversity | Quad Diversity |
| --- | --- | --- |
| −26 | 1 | 1 |
| −25 | 2 | 2 |
| −24 | 3 | 3 |
| −23 | 4 | 4 |
| −22 | 5 | 5 |
| −21 | pilot | pilot |
| −20 | 6 | 6 |
| −19 | 7 | 7 |
| −18 | 8 | 8 |
| −17 | 9 | 9 |
| −16 | 10 | 10 |
| −14 | 12 | 12 |
| −13 | 13 | 1 |
| −12 | 14 | 2 |
| −11 | 15 | 3 |
| −10 | 16 | 4 |
| −9 | 17 | 5 |
| −8 | 18 | 6 |
| −7 | pilot | pilot |
| −6 | 19 | 7 |
| −5 | 20 | 8 |
| −4 | 21 | 9 |
| −3 | 22 | 10 |
| −2 | 23 | 11 |
| −1 | 24 | 12 |
| 0 | DC | DC |
| 1 | 1 | 1 |
| 2 | 2 | 2 |
| 3 | 3 | 3 |

TABLE 2-continued

| Subband Indices | Dual Diversity | Quad Diversity |
| --- | --- | --- |
| 4 | 4 | 4 |
| 5 | 5 | 5 |
| 6 | 6 | 6 |
| 7 | pilot | pilot |
| 8 | 7 | 7 |
| 9 | 8 | 8 |
| 10 | 9 | 9 |
| 11 | 10 | 10 |
| 12 | 11 | 11 |
| 13 | 12 | 12 |
| 14 | 13 | 1 |
| 15 | 14 | 2 |
| 16 | 15 | 3 |
| 17 | 16 | 4 |
| 18 | 17 | 5 |
| 19 | 18 | 6 |
| 20 | 19 | 7 |
| 21 | pilot | pilot |
| 22 | 21 | 8 |
| 23 | 22 | 9 |
| 24 | 23 | 10 |
| 25 | 24 | 11 |
| 26 | 25 | 12 |

The frequency diversity scheme may be used by a transmitter (e.g., a terminal) not equipped with multiple transmit antennas. In this case, one transmit symbol stream is provided by TX diversity processor 310a. Each modulation symbol in s(n) may be repeated and transmitted on multiple subbands. For single-antenna terminals, frequency diversity may be used to provide robust performance in the presence of frequency selective fading.

The frequency diversity scheme may also be used when multiple transmit antennas are available. This may be achieved by transmitting the same modulation symbol from all transmit antennas on distinct subbands or subband groups. For example, in a four transmit antenna device, every fourth subband may be assigned to one of the transmit antennas. Each transmit antenna would then be associated with a different group of $N_F/4$ subbands. For quad frequency diversity, each modulation symbol would then be transmitted on a set of four subbands, one in each of the four subband groups, with each group being associated with a specific transmit antenna. The four subbands in the set may also be selected such that they are spaced as far apart as possible. For dual frequency diversity, each modulation may be transmitted on a set of two subbands, one in each of two subband groups. Other implementations for frequency diversity with multiple transmit antennas may also be contemplated, and this is within the scope of the invention. The frequency diversity scheme may also be used in combination with one or more other transmit diversity schemes, as described below.

Walsh Transmit Diversity

Figure 5:
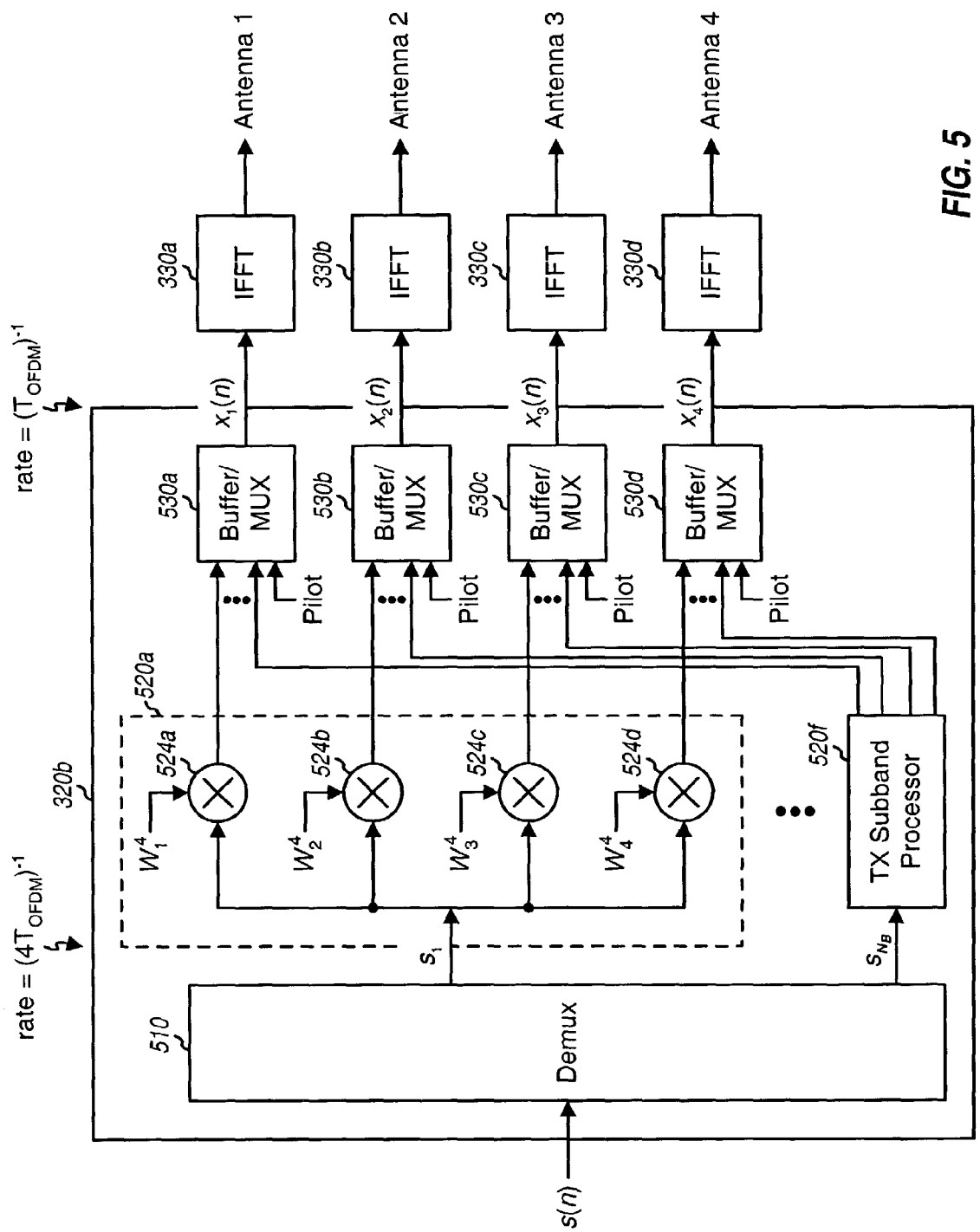
FIG. 5 is a block diagram of a TX diversity processor that may be used to implement the Walsh diversity scheme.

FIG. 5 is a block diagram of an embodiment of a TX diversity processor 320b that may be used to implement the Walsh diversity scheme. For this diversity scheme, orthogonal functions (or codes) are used to establish time orthogonality, which may in turn be used to establish full transmit diversity across all transmit antennas. This is achieved by repeating the same modulation symbols across the transmit antennas, and time spreading these symbols with a different orthogonal function for each transmit antenna, as described below. In general, various orthogonal functions may be used such as Walsh functions, orthogonal variable spreading factor (OVSF) codes, and so on. For clarity, Walsh functions are used in the following description.

In the embodiment shown in FIG. 5, the modulation symbols, s(n), from TX data processor 210 are provided to a demultiplexer 510, which demultiplexes the symbols into $N_B$ modulation symbol substreams, one substream for each subband used for data transmission (i.e., each data-carrying subband). Each modulation symbol substream $s_k(n)$ is provided to a respective TX subband processor 520.

Within each TX subband processor 520, the modulation symbols in substream $s_k(n)$ are provided to $N_T$ multipliers 524a through 524d for the $N_T$ transmit antennas (where $N_T=4$ for this example system). In the embodiment shown in FIG. 5, one modulation symbol $s_k$ is provided to all four multipliers 524 for each 4-symbol period, which corresponds to a symbol rate of $(4T_{OFDM})^{-1}$. Each multiplier also receives a different Walsh function having four chips (i.e., $W_j^4 = \{w_{1j}, w_{2j}, w_{3j}, w_{4j}\}$) and assigned to transmit antenna j associated with that multiplier. Each multiplier then multiplies the symbol $s_k$ with the Walsh function $W_j^4$ and provides a sequence of four transmit symbols, $\{(s_k \cdot w_{1j}), (s_k \cdot w_{2j}), (s_k \cdot w_{3j}), \text{ and } (s_k \cdot w_{4j})\}$, which is to be transmitted in four consecutive OFDM symbol periods on subband k of transmit antenna j. These four transmit symbols have the same magnitude as the original modulation symbol $s_k$. However, the sign of each transmit symbol in the sequence is determined by the sign of the Walsh chip used to generate that transmit symbol. The Walsh function is thus used to time-spread each modulation symbol over four symbol periods. The four multipliers 524a through 524d of each TX subband processor 520 provide four transmit symbol substreams to four buffers/multiplexers 530a through 530d, respectively.

Each buffer/multiplexer 530 receives pilot symbols and $N_B$ transmit symbol substreams for $N_B$ subbands from $N_B$ TX subband processors 520a through 520f. Each unit 530 then multiplexes the transmit symbols and pilot symbols for each symbol period, and provides a stream of transmit symbols $x_j(n)$ to a corresponding IFFT unit 330. Each IFFT unit 330 receives and processes a respective transmit symbol stream $x_j(n)$ in the manner described above.

In the embodiment shown in FIG. 5, one modulation symbol is transmitted from all four transmit antennas on each of the $N_B$ data-carrying subbands for each 4-symbol period. When four transmit antennas are used for data transmission, the spectral efficiency achieved with the Walsh diversity scheme is identical to that achieved with the quad frequency diversity scheme whereby one modulation symbol is transmitted over four data-carrying subbands for each symbol period. In the Walsh diversity scheme with four transmit antennas, the duration or length of the Walsh functions is four OFDM symbols (as designated by the superscript in $W_j^4$). Since the information in each modulation symbol is distributed over four successive OFDM symbols, the demodulation at the receiver is performed based on four consecutive received OFDM symbols.

In an alternative embodiment, increased spectral efficiency may be achieved by transmitting distinct modulation symbols (instead of the same modulation symbol) on each transmit antenna. For example, demultiplexer 510 may be designed to provide four distinct modulation symbols, $s_1$, $s_2$, $s_3$, and $s_4$, to multipliers 524a through 524d for each 4-symbol period. Each multiplier 524 would then multiply a different modulation symbol with its Walsh function to provide a different sequence of four transmit symbols. The spectral efficiency for this embodiment would then be four times that of the embodiment shown in FIG. 5. As another example, demultiplexer 510 may be designed to provide two distinct modulation symbols (e.g., $s_1$ to multipliers 524a and 524b and $s_2$ to multipliers 524c and 524d) for each 4-symbol period.

Space-Time Transmit Diversity (STTD)

Space-time transmit diversity (STTD) supports simultaneous transmission of effectively two independent symbol streams on two transmit antennas while maintaining orthogonality at the receiver. An STTD scheme may thus provide higher spectral efficiency over the Walsh transmit diversity scheme shown in FIG. 5.

The STTD scheme operates as follows. Suppose that two modulation symbols, denoted as $s_1$ and $s_2$, are to be transmitted on a given subband. The transmitter generates two vectors, $\underline{x}_1 = [s_1 \; s^*_2]^T$ and $\underline{x}_2 = [s_2 \; -s^*_1]^T$. Each vector includes two elements that are to be transmitted sequentially in two symbol periods from a respective transmit antenna (i.e., vector $\underline{x}_1$ is transmitted from antenna 1 and vector $\underline{x}_2$ is transmitted from antenna 2).

If the receiver includes a single receive antenna, then the received signal may be expressed in matrix form as:

$$\begin{bmatrix} r_1 \\ r_2 \end{bmatrix} = \begin{bmatrix} h_1 s_1 + h_2 s_2 \\ h_1 s^*_2 - h_2 s^*_1 \end{bmatrix} + \begin{bmatrix} n_1 \\ n_2 \end{bmatrix}, \qquad \text{Eq (1)}$$

where $r_1$ and $r_2$ are two symbols received in two consecutive symbol periods at the receiver;

$h_1$ and $h_2$ are the path gains from the two transmit antennas to the receive antenna for the subband under consideration, where the path gains are assumed to be constant over the subband and static over the 2-symbol period; and $n_1$ and $n_2$ are the noise associated with the two received symbols $r_1$ and $r_2$.

The receiver may then derive estimates of the two transmitted symbols, $s_1$ and $s_2$, as follows:

$$\hat{s}_1 = h^*_1 r_1 - h_2 r^*_2 = (|h_1|^2 + |h_2|^2) s_1 + h^*_1 n_1 - h_2 n_2, \text{ and} \qquad \text{Eq (2)}$$

$$\hat{s}_2 = h^*_2 r_1 + h_1 r^*_2 = (|h_1|^2 + |h_2|^2) s_2 + h^*_2 n_1 + h_1 n_2.$$

In an alternative implementation, the transmitter may generate two vectors, $\underline{x}_1 = [s_1 \; s_2]^T$ and $\underline{x}_2 = [-s^*_2 \; s^*_1]^T$, with the elements of these two vectors being transmitted sequentially in two symbol periods from the two transmit antennas. The received signal may then be expressed as:

$$\begin{bmatrix} r_1 \\ r_2 \end{bmatrix} = \begin{bmatrix} h_1 s_1 - h_2 s^*_2 \\ h_1 s_2 + h_2 s^*_1 \end{bmatrix} + \begin{bmatrix} n_1 \\ n_2 \end{bmatrix}.$$

The receiver may then derive estimates of the two transmitted symbols as follows:

$$\hat{s}_1 = h^*_1 r_1 + h_2 r^*_2 = (|h_1|^2 + |h_2|^2) s_1 + h^*_1 n_1 + h_2 n_2, \text{ and}$$

$$\hat{s}_2 = -h_2 r^*_1 + h^*_1 r_2 = (|h_1|^2 + |h_2|^2) s_2 - h_2 n_1 + h^*_1 n_2.$$

When two transmit antennas are employed for data transmission, the STTD scheme is twice as spectrally efficient as both the dual frequency diversity scheme and the Walsh diversity scheme with two transmit antennas. The STTD scheme effectively transmits one independent modulation symbol per subband over the two transmit antennas in each symbol period, whereas the dual frequency diversity scheme transmits only a single modulation symbol per two subbands in each symbol period and the Walsh diversity scheme transmits only a single modulation symbol on each subband in two symbol periods. Since the information in each modulation symbol is distributed over two successive OFDM symbols for the STTD scheme, the demodulation at the receiver is performed based on two consecutive received OFDM symbols.

Figure 6:
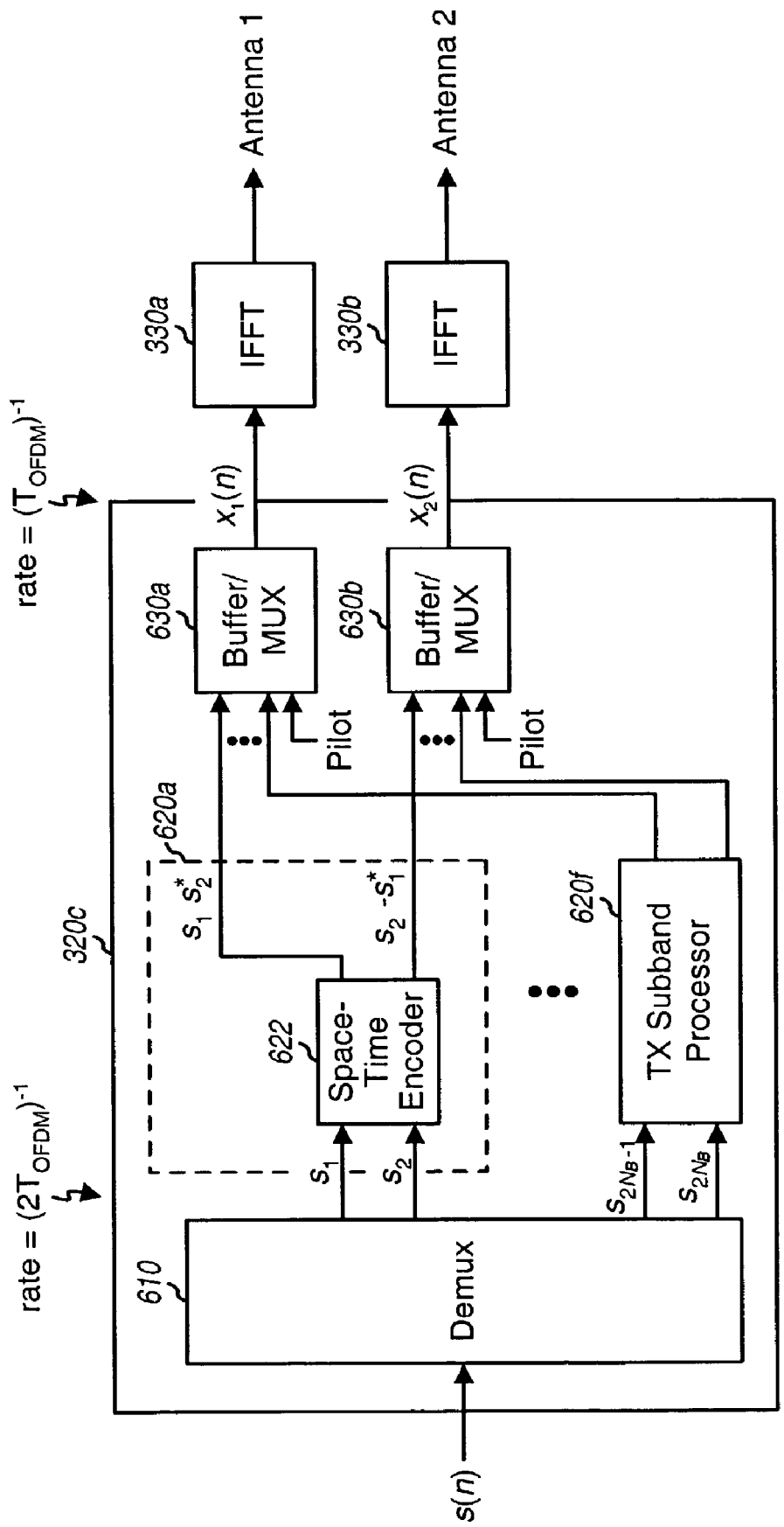
FIG. 6 is a block diagram of a TX diversity processor that may be used to implement the STTD scheme.

FIG. 6 is a block diagram of an embodiment of a TX diversity processor 320c that may be used to implement the STTD scheme. In this embodiment, the modulation symbols, s(n), from TX data processor 210 are provided to a demultiplexer 610, which demultiplexes the symbols into $2N_B$ modulation symbol substreams, two substreams for each data-carrying subband. Each pair of modulation symbol substreams is provided to a respective TX subband processor 620. Each modulation symbol substream includes one modulation symbol for each 2-symbol period, which corresponds to a symbol rate of $(2T_{OFDM})^{-1}$.

Within each TX subband processor 620, the pair of modulation symbol substreams is provided to a space-time encoder 622. For each pair of modulation symbols in the two substreams, space-time encoder 622 provides two vectors, $\underline{x}_1=[s_1 \ s^*_2]^T$ and $\underline{x}_2=[s_2 \ -s^*_1]^T$, with each vector including two transmit symbols to be transmitted in two symbol periods. The two transmit symbols in each vector have the same magnitude as the original modulation symbols, $s_1$ and $s_2$. However, each transmit symbol may be rotated in phase relative to the original modulation symbol. Each TX subband processor 620 thus provides two transmit symbol substreams to two buffers/multiplexers 630a and 630b, respectively.

Each buffer/multiplexer 630 receives pilot symbols and $N_B$ transmit symbol substreams from $N_B$ TX subband processors 620a through 620f, multiplexes the transmit symbols and pilot symbols for each symbol period, and provides a stream of transmit symbols $x_j(n)$ to a corresponding IFFT unit 330. Each IFFT unit 330 then processes a respective transmit symbol stream in the manner described above.

The STTD scheme is described in further detail by S. M. Alamouti in a paper entitled "A Simple Transmit Diversity Technique for Wireless Communications," IEEE Journal on Selected Areas in Communications, Vol. 16, No. 8, October 1998, pgs. 1451–1458, which is incorporated herein by reference. The STTD scheme is also described in further detail in U.S. patent application Ser. No. 09/737,602, entitled "Method and System for Increased Bandwidth Efficiency in Multiple Input—Multiple Output Channels," filed Jan. 5, 2001, assigned to the assignee of the present application and incorporated herein by reference.

Walsh-STTD

A Walsh-STTD scheme employs a combination of Walsh diversity and STTD described above. The Walsh-STTD scheme may be used in systems with more than two transmit antennas. For a Walsh-STTD with repeated symbols scheme (which is also referred to as the repeated Walsh-STTD scheme), two transmit vectors $\underline{x}_1$ and $\underline{x}_2$ are generated for each pair of modulation symbols to be transmitted on a given subband from two transmit antennas, as described above for FIG. 6. These two transmit vectors are also repeated across multiple pairs of transmit antennas using Walsh functions to achieve orthogonality across the transmit antenna pairs and to provide additional transmit diversity.

Figure 7:
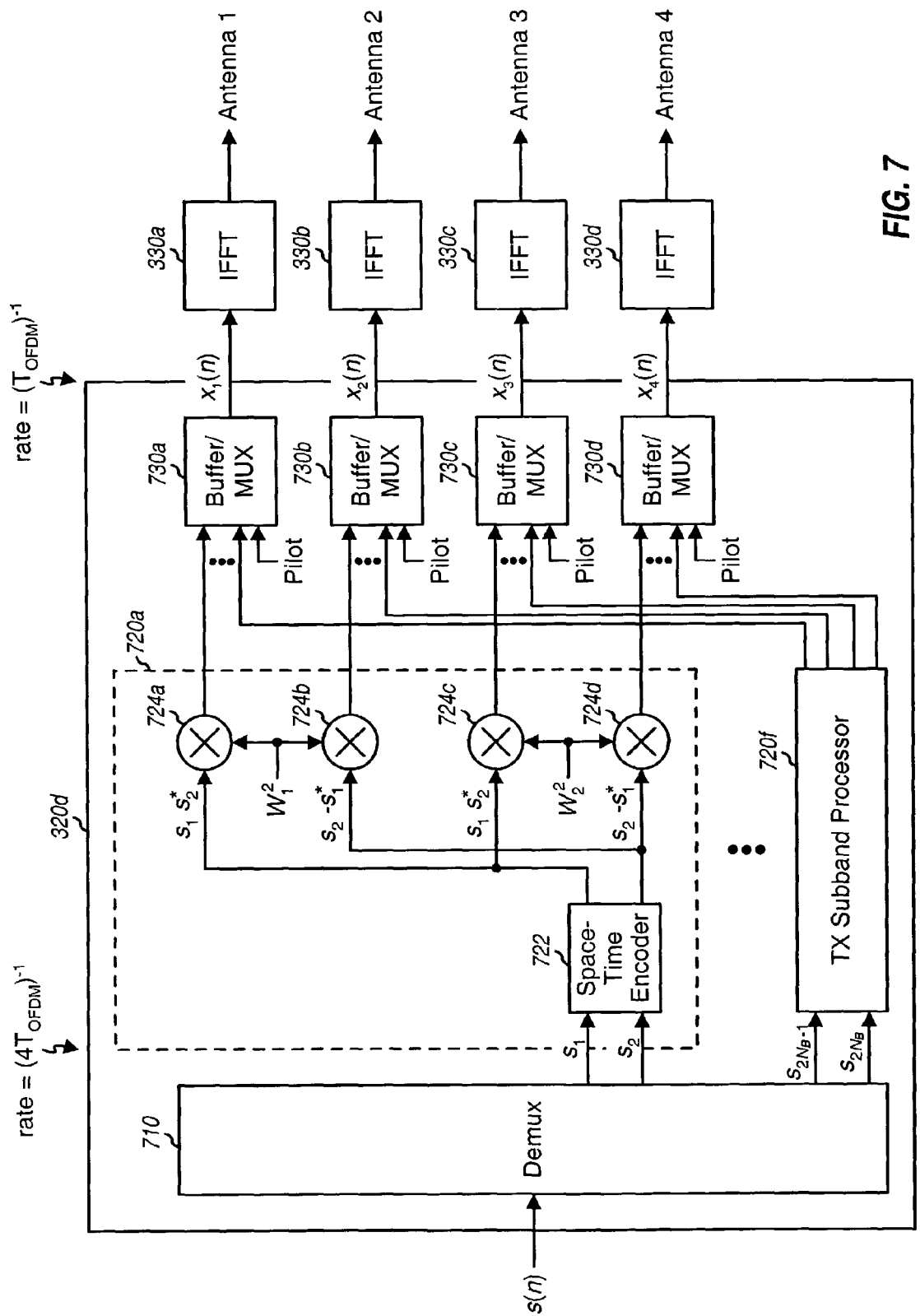
FIG. 7 is a block diagram of a TX diversity processor that may be used to implement a repeated Walsh-STTD scheme.

FIG. 7 is a block diagram of an embodiment of a TX diversity processor 320d that may be used to implement the repeated Walsh-STTD scheme. The modulation symbols, s(n), from TX data processor 210 are provided to a demultiplexer 710, which demultiplexes the symbols into $2N_B$ modulation symbol substreams, two substreams for each data-carrying subband. Each modulation symbol substream includes one modulation symbol for each 4-symbol period, which corresponds to a symbol rate of $(4T_{OFDM})^{-1}$. Each pair of modulation symbol substreams is provided to a respective TX subband processor 720.

A space-time encoder 722 within each TX subband processor 720 receives the pair of modulation symbol substreams and, for each 4-symbol period, forms a pair of modulation symbols $\{s_1 \text{ and } s_2\}$, with one symbol coming from each of the two substreams. The pair of modulation symbols $\{s_1 \text{ and } S_2\}$ is then used to form two vectors, $\underline{x}_1=[s_1 \ s^*_2]^T$ and $\underline{x}_2=[s_2 \ -s^*_1]^T$, with each vector spanning a 4-symbol period. Space-time encoder 722 provides the first vector $\underline{x}_1$ to multipliers 724a and 724c and the second vector $\underline{x}_2$ to multipliers 724b and 724d. Multipliers 724a and 724b each also receive a Walsh function having two chips (i.e., $W_1^2=\{w_{11}, w_{21}\}$) and assigned to transmit antennas 1 and 2. Similarly, multipliers 724c and 724d each also receive a Walsh function $W_2^2$ having two chips and assigned to transmit antennas 3 and 4. Each multiplier 724 then multiplies each symbol in its vector $\underline{x}_j$ with its Walsh function to provide two transmit symbols to be transmitted in two consecutive symbol periods on subband k of transmit antenna j.

In particular, multiplier 724a multiplies each symbol in vector $\underline{x}_1$ with the Walsh function $W_1^2$ and provides a sequence of four transmit symbols, $\{(s_1 \cdot w_{11}), (s_1 \cdot w_{21}), (s^*_2 \cdot w_{11}), \text{ and } (s^*_2 \cdot w_{21})\}$, which is to be transmitted in four consecutive symbol periods. Multiplier 724b multiplies each symbol in vector $\underline{x}_2$ with the Walsh function $W_1^2$ and provides a sequence of four transmit symbols, $\{(s_2 \cdot w_{11}), (s_2 \cdot w_{21}), (-s^*_1 \cdot w_{11}), \text{ and } (-s^*_1 \cdot w_{21})\}$. Multiplier 724c multiplies each symbol in vector $\underline{x}_1$ with the Walsh function $W_2^2$ and provides a sequence of four transmit symbols, $\{(s_1 \cdot w_{12}), (s_1 \cdot w_{22}), (s^*_2 \cdot w_{12}), \text{ and } (s^*_2 \cdot w_{22})\}$. And multiplier 724d multiplies each symbol in vector $\underline{x}_2$ with the Walsh function $W_2^2$ and provides a sequence of four transmit symbols, $\{(s_2 \cdot w_{12}), (s_2 \cdot w_{22}), (-s^*_1 \cdot w_{12}), \text{ and } (-s^*_1 \cdot w_{22})\}$. The Walsh function is thus used to time-spread each symbol or element in the vector $\underline{x}$ over two symbol periods. The four multipliers 724a through 724d of each TX subband processor 720 provide four transmit symbol substreams to four buffers/multiplexers 730a through 730d, respectively.

Each buffer/multiplexer 730 receives pilot symbols and $N_B$ transmit symbol substreams from $N_B$ TX subband processors 720a through 720f, multiplexes the pilot and transmit symbols for each symbol period, and provides a stream of transmit symbols $x_j(n)$ to a corresponding IFFT unit 330. The subsequent processing is as described above.

The repeated Walsh-STTD scheme shown in FIG. 7 (with four transmit antennas) has the same spectral efficiency as the STTD scheme shown in FIG. 6 and twice the spectral efficiency of the Walsh diversity scheme shown in FIG. 5. However, additional diversity is provided by this Walsh-STTD scheme by transmitting repeated symbols over multiple pairs of transmit antennas. The Walsh-STTD processing provides full transmit diversity (per subband) for the signals transmitted from all transmit antennas.

Figure 8:
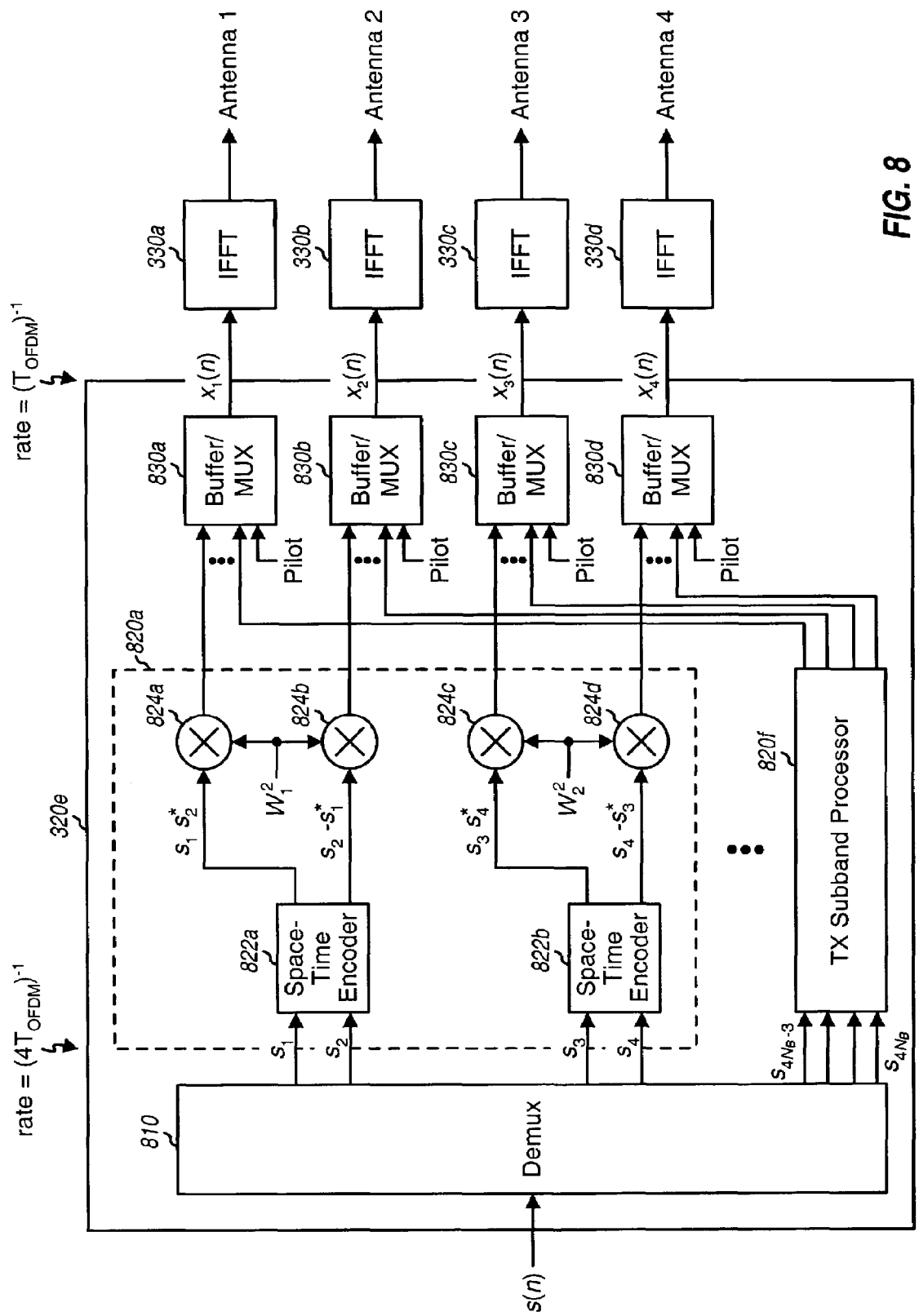
FIG. 8 is a block diagram of a TX diversity processor that may be used to implement a non-repeated Walsh-STTD scheme.

FIG. 8 is a block diagram of an embodiment of a TX diversity processor 320e that may be used to implement a Walsh-STTD without repeated symbols scheme (which is also referred to as the non-repeated Walsh-STTD scheme). This scheme may be used to increase spectral efficiency at the expense of less diversity than the scheme shown in FIG. 7. As shown in FIG. 8, the modulation symbols s(n) are provided to a demultiplexer 810, which demultiplexes the symbols into $4N_B$ modulation symbol substreams, four substreams for each data-carrying subband. Each set of four modulation symbol substreams is provided to a respective TX subband processor 820.

Within each TX subband processor 820, a space-time encoder 822a receives the first pair of modulation symbol substreams and a space-time encoder 822b receives the second pair of modulation symbol substreams. For each pair of modulation symbols in the two substreams in the first pair, space-time encoder 822a provides two vectors $\underline{x}_1=[s_1 \; s^*_2]^T$ and $\underline{x}_2=[s_2 \; -s^*_1]^T$ to multipliers 824a and 824b, respectively. Similarly, for each pair of modulation symbols in the two substreams in the second pair, space-time encoder 822b provides two vectors $\underline{x}_3=[s_3 \; s^*_4]^T$ and $\underline{x}_4=[s_4 \; -s^*_3]^T$ to multipliers 824c and 824d, respectively Multipliers 824a and 824b each also receive Walsh function $W_1^2$, and multipliers 824c and 824d each also receive Walsh function $W_2^2$. Each multiplier 824 then multiplies each symbol in its vector $\underline{x}_j$ with its Walsh function to provide two transmit symbols to be transmitted in two consecutive symbol periods on subband k of transmit antenna j. The four multipliers 824a through 824d of each TX subband processor 820 provide four transmit symbol substreams to four buffers/multiplexers 830a through 830d, respectively.

Each buffer/multiplexer 830 receives pilot symbols and $N_B$ transmit symbol substreams from $N_B$ TX subband processors 820a through 820f, multiplexes the pilot symbols and transmit symbols for each symbol period, and provides a stream of transmit symbols $x_j(n)$ to a corresponding IFFT unit 330. The subsequent processing is as described above.

The non-repeated Walsh-STTD scheme shown in FIG. 8 (with four transmit antennas) has twice the spectral efficiency as the repeated Walsh-STTD scheme shown in FIG. 7. The same processing may be extended to a system with any number of transmit antenna pairs. Instead of repeating the two transmit vectors across the pairs of transmit antennas, each transmit antenna pair may be used to transmit independent symbol streams. This results in greater spectral efficiency at the possible expense of diversity performance. Some of this diversity may be recovered by the use of forward error correction (FEC) code.

The Walsh-STTD scheme is also described in further detail in the aforementioned U.S. patent application Ser. No. 09/737,602.

Frequency-STTD

A frequency-STTD scheme employs a combination of frequency diversity and STTD. The frequency-STTD scheme may also employ antenna diversity for systems with more than one pair of transmit antennas. For the frequency-STTD scheme, each modulation symbol is transmitted on multiple (e.g., two) subbands and provided to multiple TX subband processors. The subbands to be used for each modulation symbol may be selected such that they are spaced as far apart as possible (e.g., as shown in Table 1) or based on some other subband assignment scheme. If four transmit antennas are available, then for each subband two pairs of modulation symbols are processed using STTD. The first pair of modulation symbols is transmitted from the first pair of antennas (e.g., transmit antennas 1 and 2), and the second pair of modulation symbols is transmitted from the second pair of antennas (e.g., transmit antennas 3 and 4).

Each modulation symbol is thus transmitted on multiple subbands and over multiple transmit antennas. For clarity, the processing for a given modulation symbol $s_a$ for a system with four transmit antennas and using dual frequency diversity may be performed as follows. Modulation symbol $s_a$ is initially provided to two TX subband processors (e.g., for subbands k and $k+N_F/2$). In subband k, modulation symbol $s_a$ is processed with another modulation symbol $s_b$ using STTD to form two vectors, $\underline{x}_1=[s_a \; s^*_b]^T$ and $\underline{x}_2=[s_b \; s^*_a]^T$, which are transmitted from transmit antennas 1 and 2, respectively. In subband $k+N_F/2$, modulation symbol $s_a$ is processed with another modulation symbol $s_c$ using STTD to form two vectors, $\underline{x}_3=[s_a \; s^*_c]^T$ and $\underline{x}_4=[s_c \; -s^*_a]^T$, which are transmitted from transmit antennas 3 and 4, respectively. Modulation symbol $s_c$ may be the same as modulation symbol $s_b$ or a different modulation symbol.

For the above implementation of the frequency-STTD scheme, the modulation symbol in each subband has two orders of transmit diversity provided by the STTD processing. Each modulation symbol to be transmitted has four orders of transmit diversity plus some frequency diversity provided by the use of two subbands and STTD. This frequency-STTD scheme has the same spectral efficiency as the repeated Walsh-STTD scheme. However, the total transmission time for each modulation symbol is two symbol periods with the frequency-STTD scheme, which is half the total transmission time for each modulation symbol with the Walsh-STTD scheme, since Walsh processing is not performed by the frequency-STTD scheme.

In one embodiment of the frequency-STTD scheme, all subbands are used by each pair of transmit antennas for data transmission. For quad diversity, each modulation symbol is provided to two subbands for two transmit antenna pairs, as described above. In another embodiment of the frequency-STTD scheme, each pair of transmit antennas is assigned a different subband group for data transmission. For example, in a device with two pairs of transmit antennas, every other subband may be assigned to one transmit antenna pair. Each transmit antenna pair would then be associated with a different group of $N_F/2$ subbands. For quad diversity, each modulation symbol would then be transmitted on two subbands, one in each of the two subband groups, with each group being associated with a specific transmit antenna pair. The two subbands used for each modulation symbol may be selected such that they are spaced as far apart as possible. Other implementations for frequency-STTD diversity with multiple transmit antenna pairs may also be contemplated, and this is within the scope of the invention.

As illustrated by the above, various diversity schemes may be implemented using various processing techniques described herein. For clarity, specific implementations of various diversity schemes have been described above for a specific system. Variations of these diversity schemes may also be implemented, and this is within the scope of the invention.

Moreover, other diversity schemes may also be implemented based on other combinations of the processing techniques described herein, and this is also within the scope of the invention. For example, another diversity scheme may utilize frequency diversity and Walsh transmit diversity, and yet another diversity scheme may utilize frequency diversity, Walsh diversity, and STTD.

Diversity Transmission Modes

A number of diversity transmission modes may be implemented using the transmit processing schemes described above. These diversity transmission modes may include the following:

Frequency diversity transmission mode—employs only frequency diversity (e.g., dual, quad, or some other integer multiple frequency diversity).

Walsh diversity transmission mode—employs only Walsh transmit diversity.

STTD transmission mode—employs only STTD.

Walsh-STTD transmission mode—employs both Walsh transmit diversity and STTD, with repeated or non-repeated symbols.

Frequency-STTD transmission mode—employs frequency diversity and STTD.

Frequency-Walsh transmission mode—employs frequency diversity and Walsh transmit diversity.

Frequency-Walsh-STTD transmission mode—employs frequency diversity. Walsh transmit diversity, and STTD.

The diversity transmission modes may be used for data transmission between the access points and terminals. The specific transmission mode to use for a given data stream may be dependent on various factors such as (1) the type of data being transmitted (e.g., whether common for all terminals or user-specific for a particular terminal), (2) the number of antennas available at the transmitter and receiver, (3) the channel conditions, (4) the requirements of the data transmission (e.g., the required packet error rate), and so on.

Each access point in the system may be equipped with, for example, four antennas for data transmission and reception. Each terminal may be equipped with one, two, four, or some other number of antennas for data transmission and reception. Default diversity transmission modes may be defined and used for each terminal type. In a specific embodiment, the following diversity transmission modes are used as default:

Single-antenna terminals—use frequency diversity transmission mode with dual or quad diversity.

Dual-antenna terminals—use STTD transmission mode for dual diversity and frequency-STTD transmission mode for quad diversity.

Quad-antenna terminals—use STTD transmission mode for dual diversity and Walsh-STTD transmission mode for quad diversity.

Other diversity transmission modes may also be selected as the default modes, and this is within the scope of the invention.

The diversity transmission modes may also be used to increase the reliability of data transmission on overhead channels intended to be received by all terminals in the system. In an embodiment, a specific diversity transmission mode is used for the broadcast channel, and this mode is known a priori by all terminals in the system (i.e., no signaling is required to identify the transmission mode used for the broadcast channel). In this way, the terminals are able to process and recover the data transmitted on the broadcast channel. The transmission modes used for other overhead channels may be fixed or dynamically selected. In one dynamic selection scheme, the system determines which transmission mode is the most reliable (and spectrally efficient) to use for each of the remaining overhead channels based on the mix of terminals being served. The transmission modes selected for use for these overhead channels and other configuration information may be signaled to the terminals, for example, via the broadcast channel.

With OFDM, the subbands may be treated as distinct transmission channels, and the same or different diversity transmission modes may be used for the subbands. For example, one diversity transmission mode may be used for all data-carrying subbands, or a separate diversity transmission mode may be selected for each data-carrying subband. Moreover, for a given subband, it may be possible to use different diversity transmission modes for different sets of transmit antennas.

In general, each data stream (whether for an overhead channel or a specific receiver device) may be coded and modulated based on the coding and modulation schemes selected for that data stream to provide modulation symbols. The modulation symbols are then further processed based on the diversity transmission mode selected for that data stream to provide transmit symbols. The transmit symbols are further processed and transmitted on a group of one or more subbands from a set of one or more transmit antennas designated to be used for that data stream.

Receiver Unit

Figure 9:
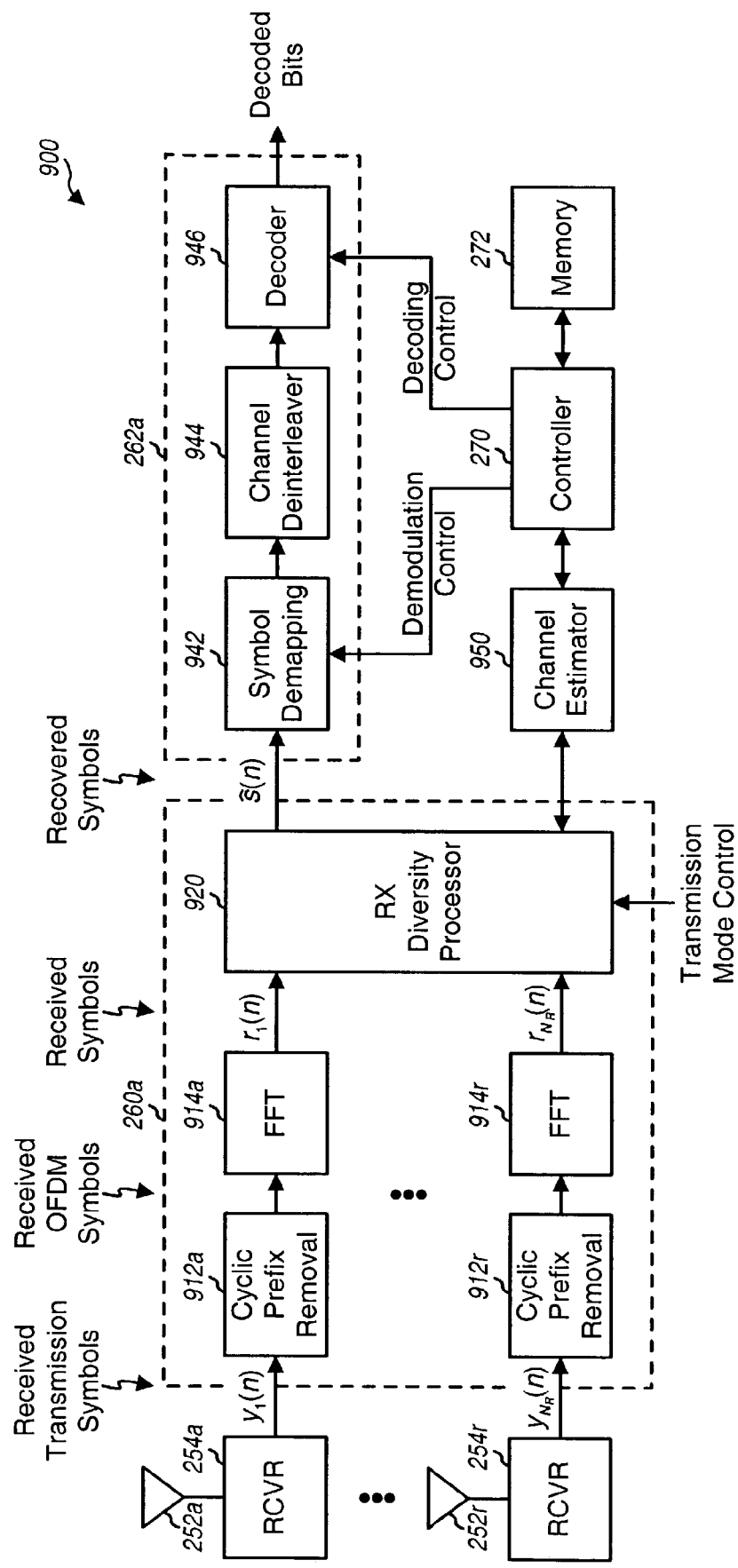
FIG. 9 is a block diagram of a receiver unit.

FIG. 9 is a block diagram of a receiver unit 900, which is an embodiment of the receiver portion of a multi-antenna terminal 106. The downlink modulated signals from access point 104 are received by antennas 252a through 252r, and the received signal from each antenna is provided to a respective receiver 254. Each receiver 254 processes (e.g., conditions, digitizes, and data demodulates) the received signal to provide a stream of received transmission symbols, which is then provided to a respective OFDM demodulator within a receive processor 260a.

Each OFDM demodulator includes a cyclic prefix removal unit 912 and a fast Fourier transform (FFT) unit 914. Unit 912 removes the cyclic prefix that had been appended in each transmission symbol to provide a corresponding received OFDM symbol. The cyclic prefix removal may be performed by determining a set of $N_A$ samples corresponding to each received transmission symbol and selecting a subset of these $N_A$ samples as the set of $N_F$ samples for the received OFDM symbol. FFT 914 then transforms each received OFDM symbol (or each set of $N_F$ samples) using the fast Fourier transform to provide a vector of $N_F$ received symbols for the $N_F$ subbands. FFT units 914a through 914r provide $N_R$ received symbol streams, $r_1(n)$ through $r_{N_R}(n)$, to an RX diversity processor 920.

RX diversity processor 920 performs diversity processing on the $N_R$ received symbol streams to provide recovered symbols, $\hat{s}(n)$, which are estimates of the modulation symbols, $s(n)$, sent by the transmitter. The processing to be performed by RX diversity processor 920 is dependent on the transmission mode used for each data stream to be recovered, as indicated by the transmission mode control. RX diversity processor 920 is described in further detail below.

RX diversity processor 920 provides the recovered symbols, $\hat{s}(n)$, for all data streams to be recovered to an RX data processor 262a, which is an embodiment of RX data processor 262 in FIG. 2. Within processor 262a, a symbol demapping element 942 demodulates the recovered symbols for each data stream in accordance with a demodulation scheme that is complementary to the modulation scheme used for the data stream. A channel deinterleaver 944 then deinterleaves the demodulated data in a manner complementary to the interleaving performed at the transmitter for the data stream, and the deinterleaved data is further decoded by a decoder 946 in a manner complementary to the coding performed at the transmitter. For example, a Turbo decoder or a Viterbi decoder may be used for decoder 946 if Turbo or convolutional coding, respectively, is performed at the transmitter. The decoded data from decoder 946 represents an estimate of the transmitted data being recovered. Decoder 946 may also provide the status of each received packet (e.g., indicating whether it was received correctly or in error).

In the embodiment shown in FIG. 9, a channel estimator 950 estimates various channel characteristics such as the channel response and the noise variance (e.g., based on recovered pilot symbols) and provides these estimates to controller 270. Controller 270 may be designed to perform various functions related to diversity processing at the receiver. For example, controller 270 may determine the diversity transmission mode used for each data stream to be recovered and may further direct the operation of RX diversity processor 920.

Figure 10:
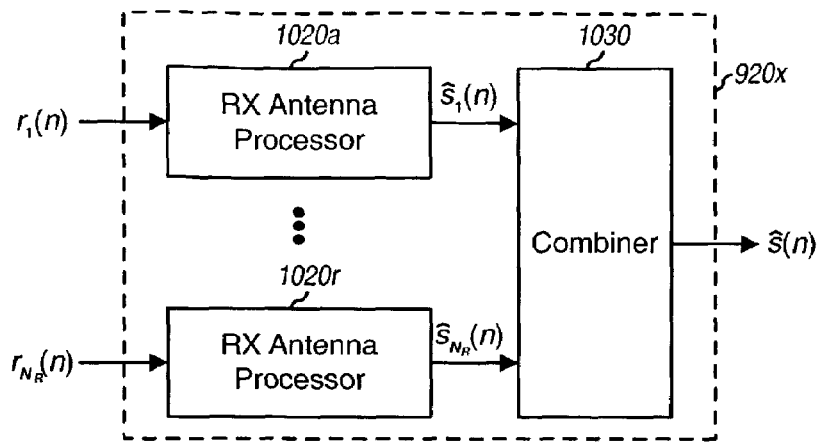
FIG. 10 is a block diagram of an RX diversity processor.

FIG. 10 is a block diagram of an embodiment of an RX diversity processor 920x, which may be used for a multi-antenna receiver device. In this embodiment, the $N_R$ received symbol streams for the $N_R$ receive antennas are provided to $N_R$ RX antenna processors 1020a through 1020r. Each RX antenna processor 1020 processes a respective received symbol stream, $r_i(n)$, and provides a corresponding recovered symbol stream, $\hat{s}_i(n)$, for the associated receive antenna. In an alternative embodiment, one or more RX antenna processors 1020 are time shared and used to process all $N_R$ received symbol streams.

A combiner 1030 then receives and combines the $N_R$ recovered symbol streams from the $N_R$ RX antenna processors 1020a through 1020r to provide a single recovered symbol stream, $\hat{s}(n)$. The combining may be performed on a symbol-by-symbol basis. In an embodiment, for a given subband k, the $N_R$ recovered symbols from the $N_R$ receive antennas for each symbol period (which are denoted as $\{\hat{s}_{ki}\}$, for i=(1, 2, . . . , $N_R$)) are initially scaled by $N_R$ weights assigned to the $N_R$ receive antennas. The $N_R$ scaled symbols are then summed to provide the recovered symbol, $\hat{s}_k$, for subband k. The weights may be selected to achieve maximal-ratio combining, and may be determined based on the signal quality (e.g., SNR) associated with the receive antennas. The scaling with the weights may also be performed via an automatic gain control (AGC) loop maintained for each receive antenna, as is known in the art.

For a single-antenna receiver device, there is only one received symbol stream. In this case, only one RX antenna processor 1020 is needed. A design for RX antenna processor 1020 is described in further detail below.

The recovered symbol steam, $\hat{s}(n)$, provided by combiner 1030 may include the recovered symbols for all data streams transmitted by the transmitter. Alternatively, the steam $\hat{s}(n)$ may include only the recovered symbols for one or more data streams to be recovered by the receiver device.

Figure 11:
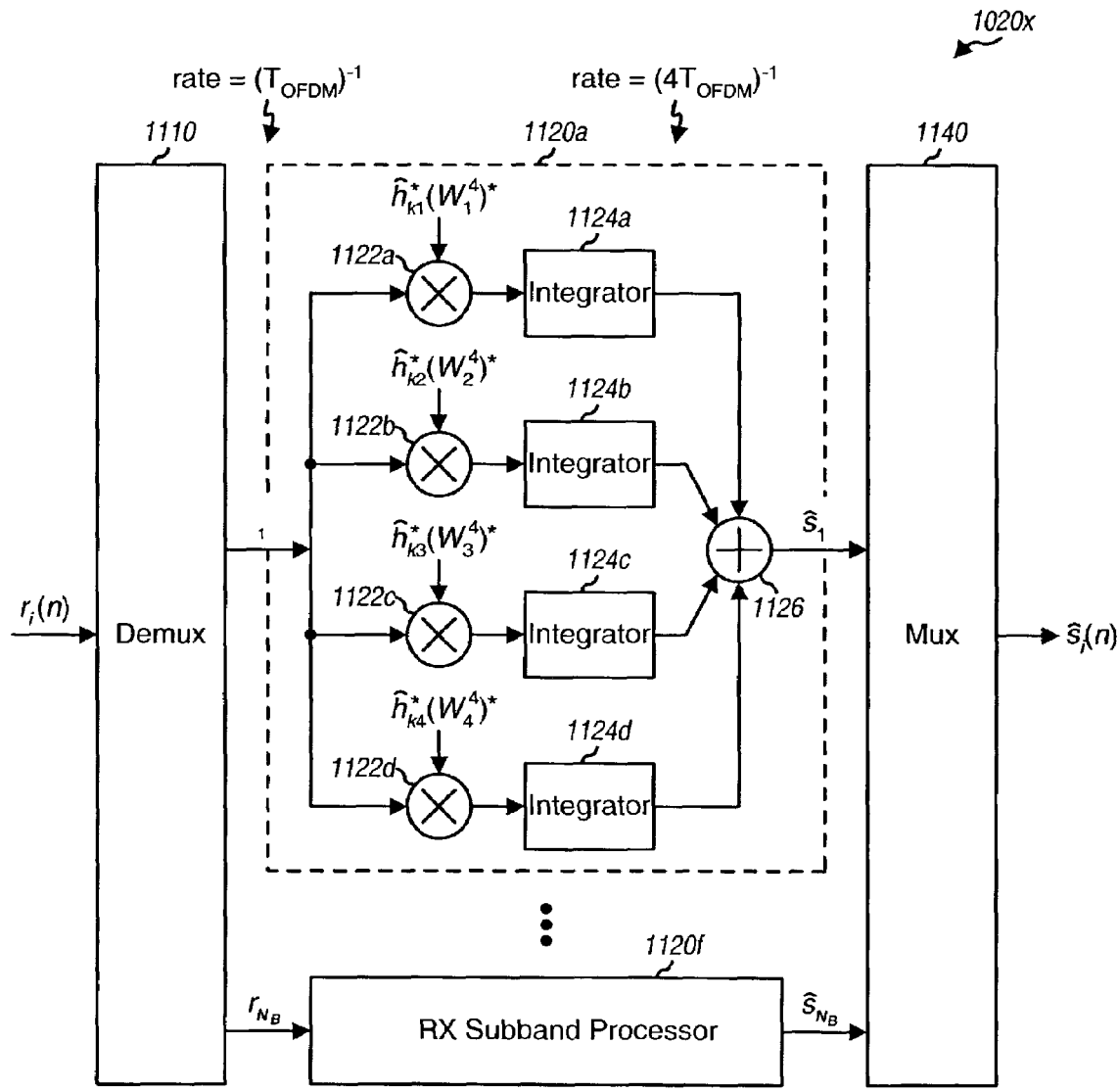
FIG. 11 is a block diagram of an RX antenna processor within the RX diversity processor and which may be used for the Walsh diversity scheme.

FIG. 11 is a block diagram of an RX antenna processor 1020x that may be used to perform the receive processing for the Walsh diversity scheme shown in FIG. 5. RX antenna processor 1020x processes the received symbol stream $r_i(n)$ for one receive antenna and may be used for each of RX antenna processors 1020a through 1020r in FIG. 10.

In the embodiment shown in FIG. 11, the received symbol stream $r_i(n)$ is provided to a demultiplexer 1110, which demultiplexes the received symbols in $r_i(n)$ into $N_B$ substreams of received symbols (which are denoted as $r_1$ through $r_{N_B}$, where the index i has been dropped for simplicity), one substream for each data-carrying subband. Each received symbol substream $r_k$ is then provided to a respective RX subband processor 1120.

Each RX subband processor 1120 includes a number of receive processing paths, one path for each transmit antenna used for data transmission (four receive processing paths are shown in FIG. 11 for four transmit antennas). For each processing path, the received symbols in the substream are provided to a multiplier 1122 that also receives a scaled Walsh function $\hat{h}^*_{kj}(W_j^4)^*$, where $\hat{h}^*_{kj}$ is the complex-conjugated channel response estimate between transmit antenna j (which is associated with that multiplier) and the receive antenna for subband k, and $(W_j^4)^*$ is the complex-conjugated Walsh function assigned to transmit antenna j. Each multiplier 1122 then multiplies the received symbols with the scaled Walsh function and provides the results to an associated integrator 1124. Integrator 1124 then integrates the multiplier results over the length of the Walsh function (or four symbol periods) and provides the integrated output to a summer 1126. One received symbol is provided to multiplier 1122 for each symbol period (i.e., rate=$(T_{OFDM})^{-1}$) and integrator 1124 provides one integrated output for each 4-symbol period (i.e., rate=$(4T_{OFDM})^{-1}$).

For each 4-symbol period, summer 1126 combines the four outputs from integrators 1124a through 1124d to provide a recovered symbol, $\hat{s}_k$, for subband k, which is an estimate of the modulation symbol, $s_k$, transmitted in that subband. For each 4-symbol period, RX subband processors 1120a through 1120f provide $N_B$ recovered symbols, $\hat{s}_1$ through $\hat{s}_{N_B}$, for the $N_B$ data-carrying subbands.

A multiplexer 1140 receives the recovered symbols from RX subband processors 1120a through 1120f and multiplexes these symbols into a recovered symbol stream, $\hat{s}_i(n)$, for receive antenna i.

Figure 12:
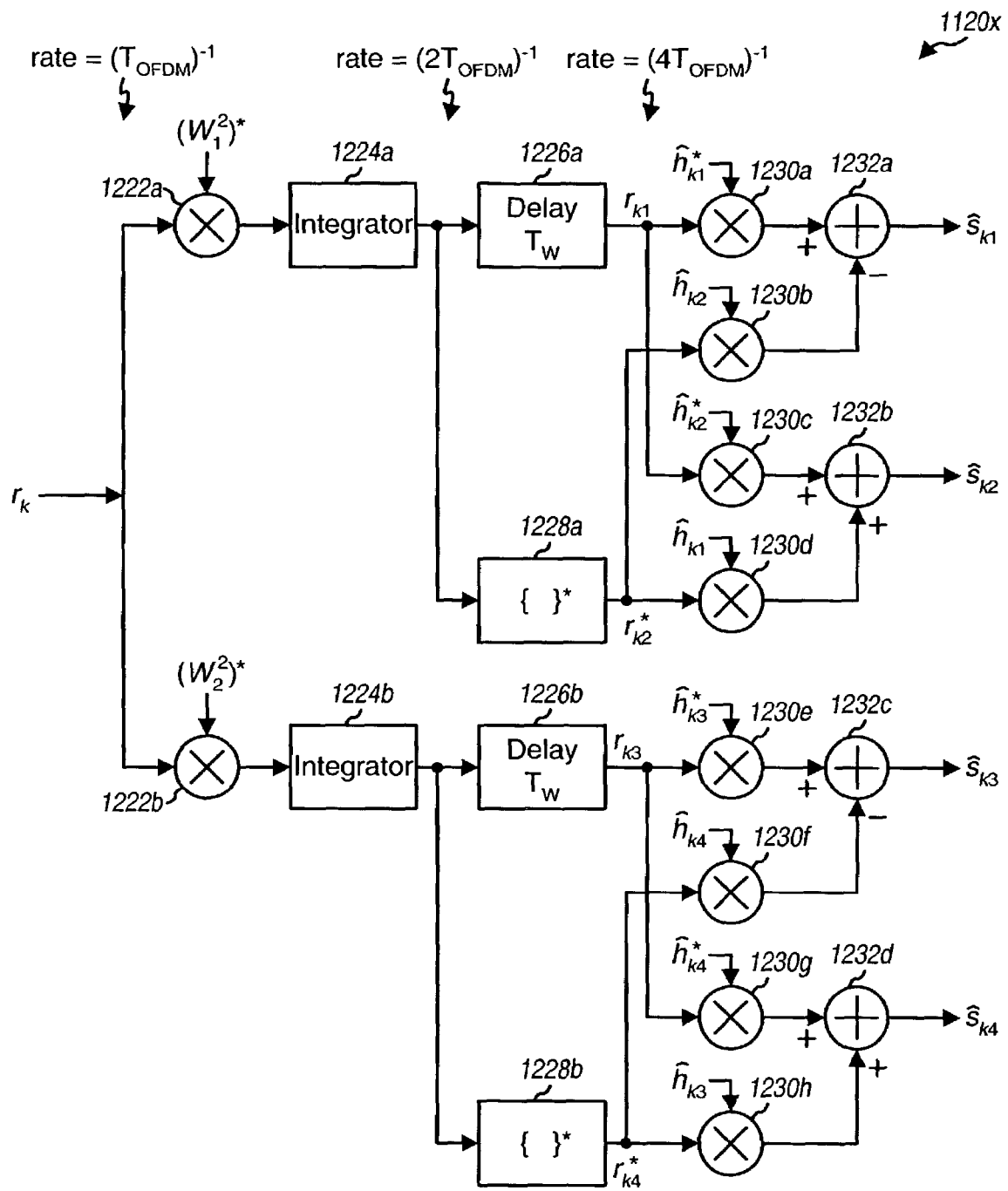
FIG. 12 is a block diagram of an RX subband processor within the RX antenna processor and which may be used for the repeated and non-repeated Walsh-STTD schemes.

FIG. 12 is a block diagram of an RX subband processor 1120x that may be used to perform the receive processing for the Walsh-STTD schemes shown in FIGS. 7 and 8. RX subband processor 1120x processes one received symbol substream $r_k$ for one subband of one receive antenna and may be used for each of RX subband processors 1120a through 1120f in FIG. 11.

In the embodiment shown in FIG. 12, the received symbols in substream $r_k$ are provided to two receive processing paths, one path for each transmit antenna pair used for data transmission (two receive processing paths are shown in FIG. 12 for four transmit antennas). For each processing path, the received symbols are provided to a multiplier 1222 that also receives a complex-conjugated Walsh function $(W_j^2)^*$ assigned to the transmit antenna pair being processed by that path. Each multiplier 1222 then multiplies the received symbols with the Walsh function and provides the results to an associated integrator 1224. Integrator 1224 then integrates the multiplier results over the length of the Walsh function (or two symbol periods) and provides the integrated output to a delay element 1226 and a unit 1228. One received symbol is provided to multiplier 1222 for each symbol period (i.e., rate=$(T_{OFDM})^{-1}$) and integrator 1224 provides one integrated output for each 2-symbol period (i.e., rate=$(2T_{OFDM})^{-1}$).

Referring back to FIG. 8, for the non-repeated Walsh-STTD scheme, four modulation symbols $\{s_{k1}, s_{k2}, s_{k3},$ and $s_{k4}\}$ are transmitted over two transmit antenna pairs in four symbol periods for subband k (where the index k is used to denote subband k). The symbol pair $\{s_{k1}$ and $s_{k2}\}$ is transmitted over the first transmit antenna pair, and the symbol pair $\{s_{k3}$ and $s_{k4}\}$ is transmitted over the second transmit antenna pair. Each modulation symbol is transmitted in two symbol periods using the 2-chip Walsh function assigned to the transmit antenna pair.

Referring back to FIG. 12, the complementary processing is performed at the receiver to recover the modulation symbols. For each 4-symbol period corresponding to a new symbol pair transmitted from each transmit antenna pair for subband k, integrator 1224 provides a received symbol pair $\{r_{k1} \text{ and } r_{k2}\}$. Delay element 1226 then provides a delay of two symbol periods (i.e., $T_W = 2T_{OFDM}$, which is the length of the Walsh function) for the first symbol (i.e., $r_{k1}$) in the pair, and unit 1228 provides the complex-conjugate of the second symbol (i.e., $r^*_{k2}$) in the pair.

Multipliers 1230a through 1230d and summers 1232a and 1232b then collectively perform the computations shown in equation (2) for the first transmit antenna pair. In particular, multiplier 1230a multiplies the symbol $r_{k1}$ with the channel response estimate $\hat{h}^*_{k1}$, multiplier 1230b multiplies the symbol $r^*_{k2}$ with the channel response estimate $\hat{h}_{k2}$, multiplier 1230c multiplies the symbol $r_{k1}$ with the channel response estimate $\hat{h}^*_{k2}$, and multiplier 1230d multiplies the symbol $r^*_{k2}$ with the channel response estimate $\hat{h}_{k1}$, where $\hat{h}_{kj}$ is an estimate of the channel response from transmit antenna j to the receive antenna for subband k. Summer 1232a then subtracts the output of multiplier 1230b from the output of multiplier 1230a to provide an estimate, $\hat{s}_{k1}$, of the first modulation symbol in the pair $\{s_{k1} \text{ and } s_{k2}\}$. Summer 1232b adds the output of multiplier 1230c with the output of multiplier 1230d to provide an estimate, $\hat{s}_{k2}$, of the second modulation symbol in the pair.

The processing by the second path for the second transmit antenna pair is similar to that described above for the first path. However, the channel response estimates, $\hat{h}_{k3}$ and $\hat{h}_{k4}$, for the second pair of transmit antennas for subband k are used for the second processing path. For each 4-symbol period, the second processing path provides the symbol estimates $\hat{s}_{k3}$ and $\hat{s}_{k4}$ for the pair of modulation symbols $\{s_{k3}$ and $s_{k4}\}$ transmitted on subband k from the second transmit antenna pair.

For the non-repeated Walsh-STTD scheme shown in FIG. 8, $\hat{s}_{k1}$, $\hat{s}_{k2}$, $\hat{s}_{k3}$, and $\hat{s}_{k4}$ represent the estimates of the four modulation symbols $s_{k1}$, $s_{k2}$, $s_{k3}$, and $s_{k4}$ sent over four transmit antennas on subband k in a 4-symbol period. These symbol estimates may then be multiplexed together into a recovered symbol substream, $\hat{s}_k(n)$, for subband k, which is then provided to multiplexer 1140 in FIG. 11.

For the repeated Walsh-STTD scheme shown in FIG. 7, one symbol pair $\{s_{k1}$ and $s_{k2}\}$ is sent over both pairs of transmit antennas on subband k in each 4-symbol period. The symbol estimates $\hat{s}_{k1}$ and $\hat{s}_{k3}$ may then be combined by a summer (not shown in FIG. 12) to provide an estimate of the first symbol in the pair, and the symbol estimates $\hat{s}_{k2}$ and $\hat{s}_{k4}$ may similarly be combined by another summer to provide an estimate of the second symbol in the pair. The symbol estimates from these two summers may then be multiplexed together into a recovered symbol substream, $\hat{s}_k(n)$, for subband k, which is then provided to multiplexer 1140 in FIG. 11.

For clarity, various details are specifically described for downlink data transmission from an access point to a terminal. The techniques described herein may also be used for the uplink, and this is within the scope of the invention. For example, the processing schemes shown in FIGS. 4, 5, 6, 7, and 8 may be implemented within a multi-antenna terminal for uplink data transmission.

The MIMO OFDM system described herein may also be designed to implement one or more multiple access schemes such as code division multiple access (CDMA), time division multiple access (TDMA), frequency division multiple access (FDMA), and so on. CDMA may provide certain advantages over other types of system, such as increased system capacity. The MIMO OFDM system may also be designed to implement various processing techniques described in CDMA standards such as IS-95, cdma2000, IS-856, W-CDMA, and others.

The techniques described herein for transmitting and receiving data using a number of diversity transmission modes may be implemented by various means. For example, these techniques may be implemented in hardware, software, or a combination thereof. For a hardware implementation, the elements (e.g., TX diversity processor, RX diversity processor, TX subband processors, RX antenna processors, RX subband processors, and so on) used to implement any one or a combination of the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, any one or a combination of the techniques described herein may be implemented with modules (e.g., procedures, functions, and so on) that perform the functions described herein. The software codes may be stored in a memory unit (e.g., memory 232 or 272 in FIG. 2) and executed by a processor (e.g., controller 230 or 270). The memory unit may be implemented within the processor or external to the processor, in which case it can be communicatively coupled to the processor via various means as it known in the art.

Headings are included herein for reference and to aid in locating certain sections. These heading are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for processing data for transmission in a multiple-input multiple-output (MIMO) communication system that utilizes orthogonal frequency division multiplexing (OFDM), comprising:

selecting a particular diversity transmission mode from among a plurality of possible transmission modes to use for each of one or more data streams, wherein each selected diversity transmission mode redundantly transmits data over time, frequency, space, or a combination thereof by using frequency diversity, Walsh transmit diversity, space time transmit diversity (STTD), or any combination and further wherein the selecting is done based in part upon at least one specific data stream channel being transmitted;

coding and modulating each data stream based on coding and modulation schemes selected for the data stream to provide modulation symbols, wherein the coding and modulating is done based in part upon the at least one specific data stream channel being transmitted; and processing the modulation symbols for each data stream based on the selected diversity transmission mode to provide transmit symbols for transmission over a plurality of transmit antennas.

2. The method of claim 1, wherein the plurality of possible transmission modes includes a frequency diversity transmission mode, a Walsh diversity transmission mode, and a STTD transmission mode.

3. The method of claim 2, wherein the plurality of possible transmission modes further includes a Walsh-STTD transmission mode.

* * * * *